US012568064B2

(12) United States Patent
Masputra et al.

(10) Patent No.: US 12,568,064 B2
(45) Date of Patent: Mar. 3, 2026

(54) SYSTEM AND METHOD FOR GRANTING INTERMEDIARY ACCESS TO A DATA FLOW BETWEEN NON-KERNEL APPLICATIONS

(71) Applicant: Apple Inc., Cupertino, CA (US)

(72) Inventors: Cahya Adiansyah Masputra, San Jose, CA (US); Eric Tsz Leung Cheng, Cupertino, CA (US); Sandeep Nair, San Jose, CA (US); Wei Shen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 18/097,084

(22) Filed: Jan. 13, 2023

(65) Prior Publication Data

US 2023/0155980 A1     May 18, 2023

Related U.S. Application Data

(62) Division of application No. 16/935,982, filed on Jul. 22, 2020, now Pat. No. 11,558,348.

(Continued)

(51) Int. Cl.
H04L 69/16          (2022.01)
H04L 9/40           (2022.01)

(52) U.S. Cl.
CPC ........ *H04L 63/0236* (2013.01); *H04L 69/161* (2013.01)

(58) Field of Classification Search
CPC ... H04L 63/0236; H04L 69/161; H04L 67/06; H04L 67/562; H04L 69/40; G06F 21/6209; G06F 21/44
See application file for complete search history.

(56) References Cited

U.S. PATENT DOCUMENTS 4,805,137 A     2/1989  Grant et al.
4,949,299 A     8/1990  Pickett
(Continued)

FOREIGN PATENT DOCUMENTS

EP        3013008 A1      4/2016
JP     H02306082 A       12/1990
(Continued)

OTHER PUBLICATIONS

Moon-Sang Lee, Joonwon Lee and S. Maeng, "Context-aware address translation for high-performance SMP cluster system," 2008u IEEE International Conference on Cluster Computing, Tsukuba, 2008, pp. 292-297, doi: 10.1109/CLUSTR.2008.4663784. (Year: 2008).

(Continued)

*Primary Examiner* — Jorge A Chu Joy-Davila
(74) *Attorney, Agent, or Firm* — STERNE, KESSLER, GOLDSTEIN & FOX P.L.L.C.

(57)          ABSTRACT

Methods and apparatus for emerging use case support in user space networking architectures. In one embodiment, an apparatus configured to segregate packet data based on a packet type is disclosed. The exemplary embodiment provides a custom data type registry that enables the definition, addition, removal, modification, and/or prioritization of custom packet processing rules. Variants of the registry may support custom ethertype packets, network packets, and/or transport packets. In another embodiment, mechanisms for enabling an intermediary packet processing stage are described. Intermediary packet processing may enable user space system extensions that support e.g., packet filtering, packet modification, and/or other forms of packet processing.

20 Claims, 15 Drawing Sheets

Related U.S. Application Data

(60) Provisional application No. 62/906,645, filed on Sep. 26, 2019.

(56)                  References Cited

U.S. PATENT DOCUMENTS

| | | | |
|---|---|---|---|
| 5,367,688 | A | 11/1994 | Croll |
| 5,467,459 | A | 11/1995 | Alexander et al. |
| 5,485,578 | A | 1/1996 | Sweazey |
| 5,506,968 | A | 4/1996 | Dukes |
| 5,613,086 | A | 3/1997 | Frey et al. |
| 5,659,542 | A | 8/1997 | Bell et al. |
| 5,708,779 | A | 1/1998 | Graziano et al. |
| 5,731,973 | A | 3/1998 | Takaishi et al. |
| 5,850,395 | A | 12/1998 | Hauser et al. |
| 5,903,564 | A | 5/1999 | Ganmukhi et al. |
| 5,943,507 | A | 8/1999 | Cornish et al. |
| 6,008,992 | A | 12/1999 | Kawakami |
| 6,032,179 | A | 2/2000 | Osborne |
| 6,216,178 | B1 | 4/2001 | Stracovsky et al. |
| 6,233,702 | B1 | 5/2001 | Horst et al. |
| 6,260,152 | B1 | 7/2001 | Cole et al. |
| 6,349,355 | B1 | 2/2002 | Draves et al. |
| 6,359,863 | B1 | 3/2002 | Varma et al. |
| 6,411,997 | B1 | 6/2002 | Dawes et al. |
| 6,485,081 | B1 | 11/2002 | Bingle et al. |
| 6,523,073 | B1 | 2/2003 | Kammer et al. |
| 6,553,446 | B1 | 4/2003 | Miller |
| 6,693,895 | B1 | 2/2004 | Crummey et al. |
| 6,815,873 | B2 | 11/2004 | Johnson et al. |
| 6,874,075 | B2 | 3/2005 | Jerding et al. |
| 6,948,094 | B2 | 9/2005 | Schultz et al. |
| 6,973,701 | B2 | 12/2005 | Momoda et al. |
| 6,990,594 | B2 | 1/2006 | Kim |
| 7,013,536 | B2 | 3/2006 | Golden et al. |
| 7,032,282 | B2 | 4/2006 | Powell et al. |
| 7,100,020 | B1 | 8/2006 | Brightman et al. |
| 7,111,307 | B1 | 9/2006 | Wang |
| 7,127,600 | B2 | 10/2006 | Zimmer et al. |
| 7,152,231 | B1 | 12/2006 | Galluscio et al. |
| 7,281,172 | B2 | 10/2007 | Chujo |
| 7,397,774 | B1 | 7/2008 | Holland et al. |
| 7,398,382 | B2 | 7/2008 | Rothman et al. |
| 7,403,542 | B1 | 7/2008 | Thompson |
| 7,506,084 | B2 | 3/2009 | Moerti et al. |
| 7,509,391 | B1 | 3/2009 | Chauvel et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,681,012 | B2 | 3/2010 | Verma et al. |
| 7,685,476 | B2 | 3/2010 | Andre et al. |
| 7,802,256 | B2 | 9/2010 | Havens |
| 7,853,731 | B1 | 12/2010 | Zeng |
| 7,899,941 | B2 | 3/2011 | Hendry et al. |
| 7,941,682 | B2 | 5/2011 | Adams |
| 8,209,704 | B1 | 6/2012 | McCann et al. |
| 8,214,707 | B2 | 7/2012 | Munson et al. |
| 8,230,248 | B2 | 7/2012 | Dance et al. |
| 8,239,947 | B1 | 8/2012 | Glick et al. |
| 8,255,725 | B2 | 8/2012 | Shimazaki et al. |
| 8,271,996 | B1 | 9/2012 | Gould et al. |
| 8,352,624 | B2 | 1/2013 | Zimmerman et al. |
| 8,359,603 | B1 | 1/2013 | McCann et al. |
| 8,468,285 | B2 | 6/2013 | Kobayashi |
| 8,555,099 | B2 | 10/2013 | Marinkovic et al. |
| 8,561,090 | B2 | 10/2013 | Schneider |
| 8,635,412 | B1 | 1/2014 | Wilshire |
| 8,656,228 | B2 | 2/2014 | Check et al. |
| 8,769,168 | B2 | 7/2014 | Moertl et al. |
| 8,788,822 | B1 | 7/2014 | Riddle |
| 8,799,537 | B1 | 8/2014 | Zhu et al. |
| 8,806,640 | B2 | 8/2014 | Wang |
| 8,819,386 | B1 | 8/2014 | Mather |
| 8,848,809 | B2 | 9/2014 | Whitby-Strevens |
| 8,855,120 | B2 | 10/2014 | Robbins |
| 8,876,062 | B1 | 11/2014 | Baghdasarian |
| 9,049,179 | B2 | 6/2015 | Luna |
| 9,130,864 | B2 | 9/2015 | Keith |
| 9,135,059 | B2 | 9/2015 | Ballard et al. |
| 9,152,580 | B1 | 10/2015 | Chau et al. |
| 9,170,957 | B2 | 10/2015 | Touzni et al. |
| 9,280,360 | B2 | 3/2016 | Xu et al. |
| 9,319,090 | B2 | 4/2016 | Whitby-Strevens |
| 9,483,305 | B1 | 11/2016 | Shmidt et al. |
| 9,544,069 | B2 | 1/2017 | Whitby-Strevens et al. |
| 9,547,535 | B1 | 1/2017 | Wilt |
| 9,594,718 | B2 | 3/2017 | Kaushik et al. |
| 9,769,756 | B1 | 9/2017 | Cui et al. |
| 9,830,289 | B2 | 11/2017 | Pulyala et al. |
| 9,910,475 | B2 | 3/2018 | Kurts et al. |
| 9,913,305 | B2 | 3/2018 | Pinheiro et al. |
| 9,932,757 | B2 | 4/2018 | Hager |
| 9,959,124 | B1 | 5/2018 | Herbeck et al. |
| 9,985,904 | B2 | 5/2018 | Shalev et al. |
| 10,078,361 | B2 | 9/2018 | Sanghi et al. |
| 10,230,608 | B2 | 3/2019 | Tsirkin |
| 10,289,555 | B1 | 5/2019 | Michaud et al. |
| 10,331,600 | B1 | 6/2019 | Rajadnya et al. |
| 10,331,612 | B1 | 6/2019 | Petkov et al. |
| 10,534,601 | B1 | 1/2020 | Venkata et al. |
| 10,552,072 | B1 | 2/2020 | Bono et al. |
| 10,585,689 | B1 | 3/2020 | Marion |
| 10,678,432 | B1 | 6/2020 | Dreier et al. |
| 10,798,059 | B1 | 10/2020 | Singh et al. |
| 10,798,224 | B2 | 10/2020 | Masputra et al. |
| 10,819,831 | B2 | 10/2020 | Masputra et al. |
| 10,999,132 | B1 | 5/2021 | Sagar et al. |
| 11,095,758 | B2 | 8/2021 | Masputra et al. |
| 11,146,665 | B2 | 10/2021 | Masputra et al. |
| 11,159,651 | B2 | 10/2021 | Masputra et al. |
| 11,178,259 | B2 | 11/2021 | Masputra et al. |
| 11,178,260 | B2 | 11/2021 | Masputra et al. |
| 11,212,373 | B2 | 12/2021 | Masputra et al. |
| 11,368,560 | B2 | 6/2022 | Masputra et al. |
| 11,477,123 | B2 | 10/2022 | Masputra et al. |
| 11,558,348 | B2 | 1/2023 | Masputra et al. |
| 11,792,307 | B2 | 10/2023 | Masputra et al. |
| 11,824,962 | B2 | 11/2023 | Masputra et al. |
| 11,829,303 | B2 | 11/2023 | Masputra et al. |
| 11,843,683 | B2 | 12/2023 | Masputra et al. |
| 2001/0037410 | A1 | 11/2001 | Gardner |
| 2002/0013868 | A1 | 1/2002 | West |
| 2002/0044553 | A1 | 4/2002 | Chakravorty |
| 2002/0053011 | A1 | 5/2002 | Aiken et al. |
| 2002/0065867 | A1 | 5/2002 | Chauvel |
| 2002/0169938 | A1 | 11/2002 | Scott et al. |
| 2002/0195177 | A1 | 12/2002 | Hinkley et al. |
| 2003/0014607 | A1 | 1/2003 | Slavin et al. |
| 2003/0061395 | A1 | 3/2003 | Kingsbury et al. |
| 2003/0120935 | A1 | 6/2003 | Teal et al. |
| 2003/0200413 | A1 | 10/2003 | Gurumoorthy et al. |
| 2004/0010473 | A1 | 1/2004 | Hsu et al. |
| 2004/0010545 | A1 | 1/2004 | Pandya |
| 2004/0044929 | A1 | 3/2004 | Chujo |
| 2004/0105384 | A1 | 6/2004 | Gallezot et al. |
| 2004/0128568 | A1 | 7/2004 | O'Shea |
| 2004/0179546 | A1 | 9/2004 | McDaniel et al. |
| 2004/0201749 | A1 | 10/2004 | Malloy Desormeaux |
| 2004/0221056 | A1 | 11/2004 | Kobayashi |
| 2004/0228365 | A1 | 11/2004 | Kobayashi |
| 2004/0249957 | A1 | 12/2004 | Ekis et al. |
| 2005/0055406 | A1 | 3/2005 | Singhai et al. |
| 2005/0068897 | A1 | 3/2005 | Arita et al. |
| 2005/0076196 | A1 | 4/2005 | Zimmer et al. |
| 2005/0076244 | A1 | 4/2005 | Watanabe |
| 2005/0108385 | A1 | 5/2005 | Wechter et al. |
| 2005/0114620 | A1 | 5/2005 | Justen |
| 2005/0117601 | A1 | 6/2005 | Anderson et al. |
| 2005/0138628 | A1 | 6/2005 | Bradford et al. |
| 2005/0140683 | A1 | 6/2005 | Collins et al. |
| 2005/0149711 | A1 | 7/2005 | Zimmer et al. |
| 2005/0157781 | A1 | 7/2005 | Ho et al. |
| 2005/0198777 | A1 | 9/2005 | Mabe |
| 2005/0278498 | A1 | 12/2005 | Ahluwalia et al. |
| 2005/0285862 | A1 | 12/2005 | Noda et al. |

(56) References Cited

U.S. PATENT DOCUMENTS

| | | | |
|---|---|---|---|
| 2006/0039285 A1 | 2/2006 | Chapman et al. | |
| 2006/0047989 A1 | 3/2006 | Delgado et al. | |
| 2006/0075119 A1 | 4/2006 | Hussain et al. | |
| 2006/0107071 A1 | 5/2006 | Girish et al. | |
| 2006/0136570 A1 | 6/2006 | Pandya | |
| 2006/0186700 A1 | 8/2006 | Browne et al. | |
| 2006/0186706 A1 | 8/2006 | Browne et al. | |
| 2006/0215697 A1 | 9/2006 | Olderdissen | |
| 2006/0218301 A1 | 9/2006 | O'Toole et al. | |
| 2006/0232051 A1 | 10/2006 | Morris et al. | |
| 2006/0248542 A1 | 11/2006 | Wang et al. | |
| 2007/0005869 A1 | 1/2007 | Balraj et al. | |
| 2007/0008983 A1 | 1/2007 | Van Doren et al. | |
| 2007/0043901 A1 | 2/2007 | Wu et al. | |
| 2007/0063540 A1 | 3/2007 | Browne et al. | |
| 2007/0063541 A1 | 3/2007 | Browne et al. | |
| 2007/0070997 A1 | 3/2007 | Weitz et al. | |
| 2007/0080013 A1 | 4/2007 | Melz et al. | |
| 2007/0086480 A1 | 4/2007 | Elzur | |
| 2007/0118831 A1 | 5/2007 | Kondo | |
| 2007/0180041 A1 | 8/2007 | Suzuoki | |
| 2007/0183418 A1 | 8/2007 | Riddoch et al. | |
| 2007/0201492 A1 | 8/2007 | Kobayashi | |
| 2007/0226375 A1 | 9/2007 | Chu et al. | |
| 2007/0226417 A1 | 9/2007 | Davis | |
| 2007/0255802 A1 | 11/2007 | Aloni et al. | |
| 2007/0255866 A1 | 11/2007 | Aloni et al. | |
| 2007/0261307 A1 | 11/2007 | Alexander | |
| 2007/0286246 A1 | 12/2007 | Kobayashi | |
| 2008/0005794 A1 | 1/2008 | Inoue et al. | |
| 2008/0007081 A1 | 1/2008 | Shibata et al. | |
| 2008/0010563 A1 | 1/2008 | Nishimura | |
| 2008/0046689 A1 | 2/2008 | Chen et al. | |
| 2008/0059644 A1* | 3/2008 | Bakke | H04L 69/161 |
| | | | 709/227 |
| 2008/0077816 A1 | 3/2008 | Ravichandran | |
| 2008/0100079 A1 | 5/2008 | Herrera et al. | |
| 2008/0100092 A1 | 5/2008 | Gao et al. | |
| 2008/0120911 A1 | 5/2008 | Browne et al. | |
| 2008/0127292 A1 | 5/2008 | Cooper et al. | |
| 2008/0148291 A1 | 6/2008 | Huang et al. | |
| 2008/0183931 A1 | 7/2008 | Verm et al. | |
| 2008/0231711 A1 | 9/2008 | Glen et al. | |
| 2008/0235355 A1 | 9/2008 | Spanier et al. | |
| 2008/0244259 A1 | 10/2008 | Zimmer et al. | |
| 2008/0276056 A1 | 11/2008 | Giacomoni et al. | |
| 2008/0301148 A1 | 12/2008 | Lee et al. | |
| 2009/0006920 A1 | 1/2009 | Munson et al. | |
| 2009/0024924 A1 | 1/2009 | Kim | |
| 2009/0092057 A1 | 4/2009 | Doctor et al. | |
| 2009/0113141 A1 | 4/2009 | Bullman et al. | |
| 2009/0138650 A1 | 5/2009 | Lin et al. | |
| 2009/0172674 A1 | 7/2009 | Bobak et al. | |
| 2009/0177847 A1 | 7/2009 | Ceze et al. | |
| 2009/0189442 A1 | 7/2009 | Chi | |
| 2009/0225818 A1 | 9/2009 | Dapper et al. | |
| 2009/0240874 A1 | 9/2009 | Pong | |
| 2009/0265723 A1 | 10/2009 | Mochizuki et al. | |
| 2009/0322531 A1 | 12/2009 | Estevez et al. | |
| 2010/0005014 A1 | 1/2010 | Castle et al. | |
| 2010/0017655 A1 | 1/2010 | Gooding et al. | |
| 2010/0049876 A1 | 2/2010 | Pope et al. | |
| 2010/0057913 A1* | 3/2010 | DeHaan | G06F 9/50 |
| | | | 709/226 |
| 2010/0057932 A1 | 3/2010 | Pope et al. | |
| 2010/0082859 A1 | 4/2010 | Hendry et al. | |
| 2010/0098419 A1 | 4/2010 | Levy et al. | |
| 2010/0118041 A1 | 5/2010 | Chen et al. | |
| 2010/0329319 A1 | 12/2010 | Dai et al. | |
| 2011/0029696 A1 | 2/2011 | Uehara | |
| 2011/0035575 A1 | 2/2011 | Kwon | |
| 2011/0052142 A1 | 3/2011 | Sultenfuss et al. | |
| 2011/0083002 A1 | 4/2011 | Albers et al. | |
| 2011/0125949 A1* | 5/2011 | Mudigonda | G06F 13/128 |
| | | | 710/308 |
| 2011/0161619 A1 | 6/2011 | Kaminski et al. | |
| 2011/0219208 A1 | 9/2011 | Asaad et al. | |
| 2011/0242425 A1 | 10/2011 | Zeng | |
| 2011/0246742 A1 | 10/2011 | Kogen et al. | |
| 2011/0276710 A1 | 11/2011 | Mighani et al. | |
| 2011/0292936 A1 | 12/2011 | Wang et al. | |
| 2011/0310296 A1 | 12/2011 | Lee et al. | |
| 2011/0320861 A1 | 12/2011 | Bayer et al. | |
| 2012/0017063 A1 | 1/2012 | Hummel et al. | |
| 2012/0036334 A1 | 2/2012 | Horman et al. | |
| 2012/0072658 A1 | 3/2012 | Hashimoto | |
| 2012/0084483 A1 | 4/2012 | Sanjive | |
| 2012/0084484 A1 | 4/2012 | Post et al. | |
| 2012/0102307 A1 | 4/2012 | Wong | |
| 2012/0124252 A1 | 5/2012 | Kayama | |
| 2012/0203880 A1 | 8/2012 | Kluyt et al. | |
| 2012/0224640 A1 | 9/2012 | Sole Rojals et al. | |
| 2012/0229076 A1 | 9/2012 | Zhu et al. | |
| 2012/0260017 A1 | 10/2012 | Mine et al. | |
| 2013/0039278 A1 | 2/2013 | Bouazizi et al. | |
| 2013/0050216 A1 | 2/2013 | Whitby-Strevens et al. | |
| 2013/0057567 A1 | 3/2013 | Frank et al. | |
| 2013/0067018 A1 | 3/2013 | Reynolds et al. | |
| 2013/0067188 A1 | 3/2013 | Mehra et al. | |
| 2013/0091772 A1 | 4/2013 | Berger et al. | |
| 2013/0111014 A1 | 5/2013 | Lawrie et al. | |
| 2013/0138840 A1 | 5/2013 | Kegel et al. | |
| 2013/0162911 A1 | 6/2013 | Glen | |
| 2013/0204927 A1 | 8/2013 | Kruglikov et al. | |
| 2013/0205113 A1 | 8/2013 | Ahmad et al. | |
| 2013/0275976 A1 | 10/2013 | Dawson et al. | |
| 2013/0290947 A1 | 10/2013 | Li | |
| 2013/0347131 A1 | 12/2013 | Mooring et al. | |
| 2014/0033220 A1 | 1/2014 | Campbell et al. | |
| 2014/0068624 A1 | 3/2014 | Fuller et al. | |
| 2014/0068636 A1 | 3/2014 | Dupont et al. | |
| 2014/0122695 A1 | 5/2014 | Kulikov et al. | |
| 2014/0122828 A1 | 5/2014 | Kagan et al. | |
| 2014/0173236 A1 | 6/2014 | Kegel | |
| 2014/0189057 A1 | 7/2014 | Sankoda et al. | |
| 2014/0211894 A1 | 7/2014 | Yang | |
| 2014/0247983 A1 | 9/2014 | MacInnis et al. | |
| 2014/0355606 A1 | 12/2014 | Riddoch et al. | |
| 2015/0007262 A1 | 1/2015 | Aissi et al. | |
| 2015/0036051 A1 | 2/2015 | Broberg et al. | |
| 2015/0058444 A1 | 2/2015 | Willmann | |
| 2015/0081985 A1 | 3/2015 | Archer et al. | |
| 2015/0156122 A1 | 6/2015 | Singh et al. | |
| 2015/0172345 A1 | 6/2015 | Mantin et al. | |
| 2015/0189109 A1 | 7/2015 | Whitby-Strevens et al. | |
| 2015/0205749 A1 | 7/2015 | Whitby-Strevens et al. | |
| 2015/0212806 A1 | 7/2015 | Hsieh | |
| 2015/0244804 A1 | 8/2015 | Warfield et al. | |
| 2015/0261588 A1 | 9/2015 | Liu et al. | |
| 2015/0309940 A1 | 10/2015 | Kumar | |
| 2015/0326542 A1 | 11/2015 | Serebrin | |
| 2015/0363110 A1 | 12/2015 | Batra et al. | |
| 2015/0370582 A1 | 12/2015 | Kinsella et al. | |
| 2015/0378737 A1 | 12/2015 | Debbage et al. | |
| 2016/0028635 A1 | 1/2016 | Wang | |
| 2016/0034195 A1 | 2/2016 | Li et al. | |
| 2016/0041852 A1 | 2/2016 | Suarez Gracia et al. | |
| 2016/0044143 A1 | 2/2016 | Narasimhamurthy | |
| 2016/0063258 A1 | 3/2016 | Ackerly | |
| 2016/0077989 A1 | 3/2016 | Pulyala et al. | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |
| 2016/0142988 A1 | 5/2016 | Powell et al. | |
| 2016/0208539 A1 | 7/2016 | Hofmann et al. | |
| 2016/0224442 A1 | 8/2016 | Sanghi et al. | |
| 2016/0226957 A1 | 8/2016 | Zhang et al. | |
| 2016/0226967 A1 | 8/2016 | Zhang et al. | |
| 2016/0231929 A1 | 8/2016 | Tsirkin | |
| 2016/0261632 A1 | 9/2016 | Kölhi et al. | |
| 2016/0269991 A1 | 9/2016 | Van Greunen et al. | |
| 2016/0357443 A1 | 12/2016 | Li et al. | |
| 2016/0363955 A1 | 12/2016 | Stevens et al. | |
| 2016/0364350 A1 | 12/2016 | Sanghi et al. | |

(56)                References Cited

U.S. PATENT DOCUMENTS

| | | |
|---|---|---|
| 2016/0378545 A1 | 12/2016 | Ho |
| 2017/0003977 A1 | 1/2017 | Sumida et al. |
| 2017/0003997 A1 | 1/2017 | Kelly et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1 | 8/2018 | Petrbok et al. |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | Laurent |
| 2018/0329743 A1 | 11/2018 | Pope et al. |
| 2018/0343206 A1 | 11/2018 | White et al. |
| 2018/0357176 A1 | 12/2018 | Wang |
| 2019/0007850 A1 | 1/2019 | DenBoer et al. |
| 2019/0036893 A1 | 1/2019 | Jiang |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0140983 A1 | 5/2019 | Tu et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306076 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2021/0011856 A1 | 1/2021 | Xia et al. |
| 2021/0097006 A1 | 4/2021 | Masputra et al. |
| 2021/0099391 A1 | 4/2021 | Masputra et al. |
| 2021/0099427 A1 | 4/2021 | Masputra et al. |
| 2022/0030095 A1 | 1/2022 | Masputra et al. |
| 2022/0046117 A1 | 2/2022 | Masputra et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO 2008070138 A2 | 6/2008 |

OTHER PUBLICATIONS

Honda et al, "Rekindling Network Protocol Innovation with User-Level Stacks", ACM SIGCOMM Computer Communication Review, vol. 44, No. 2, Apr. 2014.

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

ECN L1 PM Substates with CLKREQ approved Aug. 23, 2012.

Jackson, "PCI Express Technology", Sep. 2012 (Sep. 2012), MindShare Press, xP002777351, pp. 49, 86, 87, 712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: <URL https://www.doc.ic.ac.uk/teaching/distinguished-projects/2010/m.whitworth.pdf> (Year: 2010).

* cited by examiner

SYSTEM AND METHOD FOR GRANTING INTERMEDIARY ACCESS TO A DATA FLOW BETWEEN NON-KERNEL APPLICATIONS

PRIORITY

This application is a divisional of U.S. patent application Ser. No. 16/935,982, filed Jul. 22, 2020 and entitled "Methods and Apparatus for Emerging Use Case Support in User Space Networking", which claims the benefit of U.S. Provisional Patent Application Ser. No. 62/906,645 filed Sep. 26, 2019 and entitled "Methods and Apparatus for Emerging Use Case Support in User Space Networking", both of which are incorporated herein by reference in their entireties.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 16/368,396 filed on Mar. 26, 2019 and entitled "Methods and Apparatus for Sharing and Arbitration of Host Stack Information with User Space Communication Stacks", U.S. patent application Ser. No. 16/363,495 filed on Mar. 25, 2019 and entitled "Methods and Apparatus for Dynamic Packet Pool Configuration in Networking Stack Infrastructures", U.S. patent application Ser. No. 16/368,338 filed on Mar. 28, 2019 and entitled "Methods and Apparatus for Memory Allocation and Reallocation in Networking Stack Infrastructures", U.S. patent application Ser. No. 16/365,484 filed on Mar. 26, 2019 and entitled "Methods and Apparatus for Virtualized Hardware Optimizations for User Space Networking", U.S. patent application Ser. No. 16/368,368 filed on Mar. 28, 2019 and entitled "Methods and Apparatus for Active Queue Management in User Space Networking", and U.S. patent application Ser. No. 16/368,214 filed on Mar. 28, 2019 and entitled "Methods and Apparatus for Self-Tuning Operation with User Space Stack Architectures", U.S. patent application Ser. No. 16/936,228 filed contemporaneously herewith on Jul. 22, 2020 and entitled "Methods and Apparatus for Low Latency Operation in User Space Networking", U.S. patent application Ser. No. 16/936,143 filed contemporaneously herewith on Jul. 22, 2020 and entitled "Methods and Apparatus for Device Driver Operation in Non-Kernel Space", each of the foregoing being incorporated herein by reference in its entirety.

Copyright

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed in one exemplary aspect to methods and apparatus for implementing computerized networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past few years, new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of emerging use case applications (e.g., ethertype and/or internet protocol (IP) applications) would benefit from custom packet handling.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions would be able to enable at least some level of custom packet handling.

SUMMARY

The present disclosure satisfies the foregoing needs by providing, inter alia, methods and apparatus for emerging use case support within user space networking stack infrastructures.

In one aspect, an apparatus is disclosed. In one embodiment, the apparatus includes: a network interface configured to communicate with a network; a processor; and a non-transitory computer readable apparatus comprising a storage medium having one or more computer programs stored thereon. In one exemplary embodiment, the one or more computer programs when executed by the processor, causes the apparatus to: receive a request for a custom packet type from a non-kernel space application; determine whether to grant the request for the custom packet type; when granted, reserve the custom packet type within a custom packet type registry of a kernel space; and perform kernel space packet processing based on the custom packet type stored in the custom packet type registry.

In one variant, the one or more computer programs when executed by the processor, further causes the apparatus to clear the custom packet type from the custom packet type registry of the kernel space when released.

In one variant, the custom packet type includes a custom ethertype. In one variant, the custom packet type comprises a custom internet protocol (IP) type. In one variant, the custom packet type includes kernel space packet processing logic.

In one variant, the one or more computer programs when executed by the processor, further causes the apparatus to determine whether to deny the request for the custom packet type based on the custom packet type registry. In one such variant, the one or more computer programs when executed by the processor, further causes the apparatus to determine whether to amend the request for the custom packet type based on the custom packet type registry.

In one aspect, a method for registering custom packet processing is disclosed. In one embodiment, the method includes: transacting data packets via a plurality of non-kernel space applications; requesting custom packet processing for a first user space application of the plurality of non-kernel space applications; wherein the custom packet processing is executed in kernel space by a kernel space entity; and wherein the custom packet processing is specific to the first user space application.

In one variant, the method includes executing the kernel space entity with a different privilege than the plurality of non-kernel space applications.

In one variant, the custom packet processing includes calling a kernel networking extension.

In one variant, the custom packet processing is performed on a custom ethertype packet data structure. In one variant, the custom packet processing is performed on a custom internet protocol (IP) packet data structure. In one variant, custom packet processing is based on a custom packet type registry.

In one aspect, a method for enabling an intermediary packet processing stage is disclosed. In one embodiment, the method includes: receiving a request from an intermediary application for intermediary access to a data flow between a first non-kernel application and a second non-kernel application; allocating a data structure; exposing the data structure to the intermediary application; and copying the data flow from the first non-kernel application into the data structure.

In one variant, the data structure includes a receive data structure and a transmit data structure; and the method includes: copying the data flow includes copying the data flow into the receive data structure; and exposing the receive data structure and the transmit data structure to the intermediary application.

In one variant, the method includes providing the transmit data structure as an input data flow to the second non-kernel application.

In one variant, the method includes deallocating the data structure when the intermediary application terminates.

In one variant, the data structure is a zero-copy data structure and copying the data flow the first non-kernel application includes an original write of the data flow into the zero-copy data structure.

In one variant, intermediary access comprises read-only access to the data structure.

In one variant, intermediary access comprises read-write access to the data structure.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

Other features and advantages of the present disclosure will immediately be recognized by persons of ordinary skill in the art with reference to the attached drawings and detailed description of exemplary embodiments as given below.

All figures © Copyright 2017-2020 Apple Inc. All rights reserved.

DETAILED DESCRIPTION

Reference is now made to the drawings, wherein like numerals refer to like parts throughout.

Detailed Description of Exemplary Embodiments

Existing Network Socket Technologies—

Figure 1:
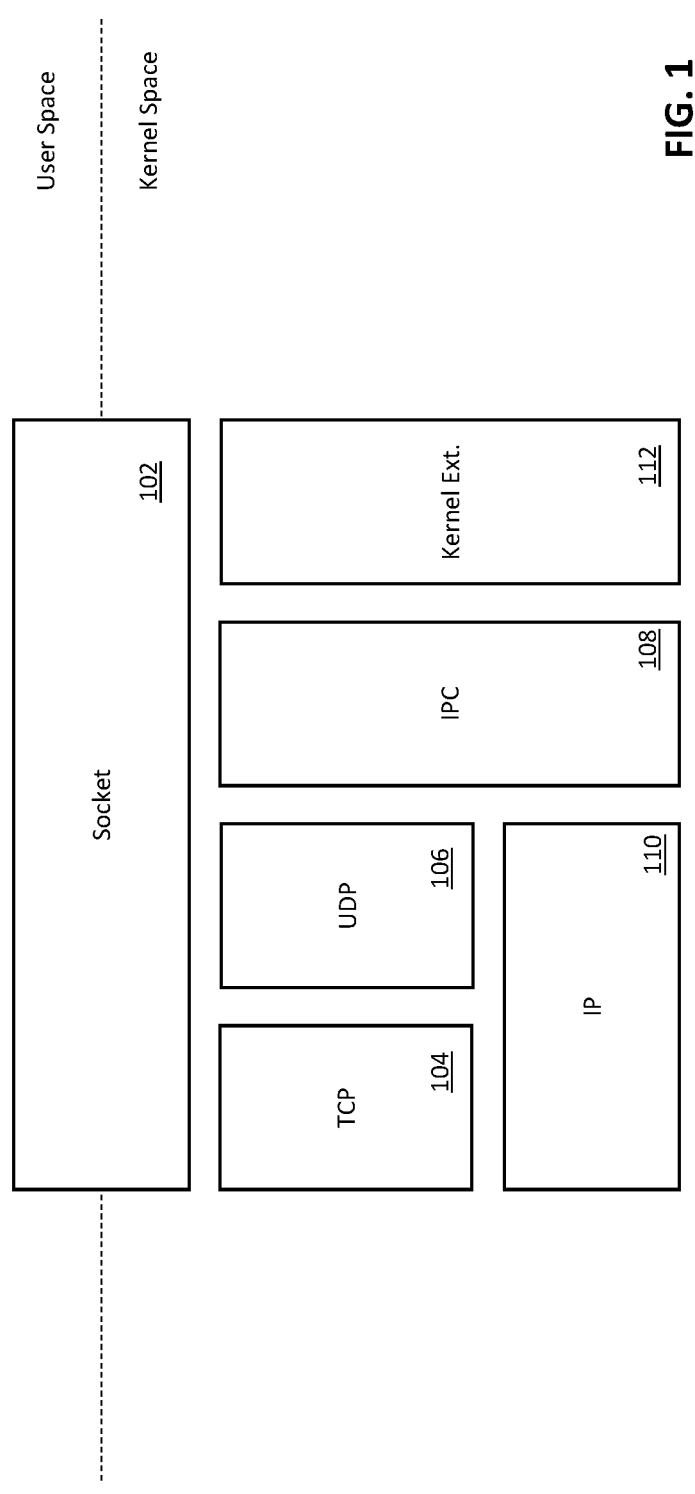
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox") and cannot access the memory of other processes unless explicitly allowed. In contrast, the kernel is the core of a computer's operating system; the kernel can exert complete control over all other processes in the system.

The term "operating system" may refer to software that controls and manages access to hardware. An 0/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating —300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
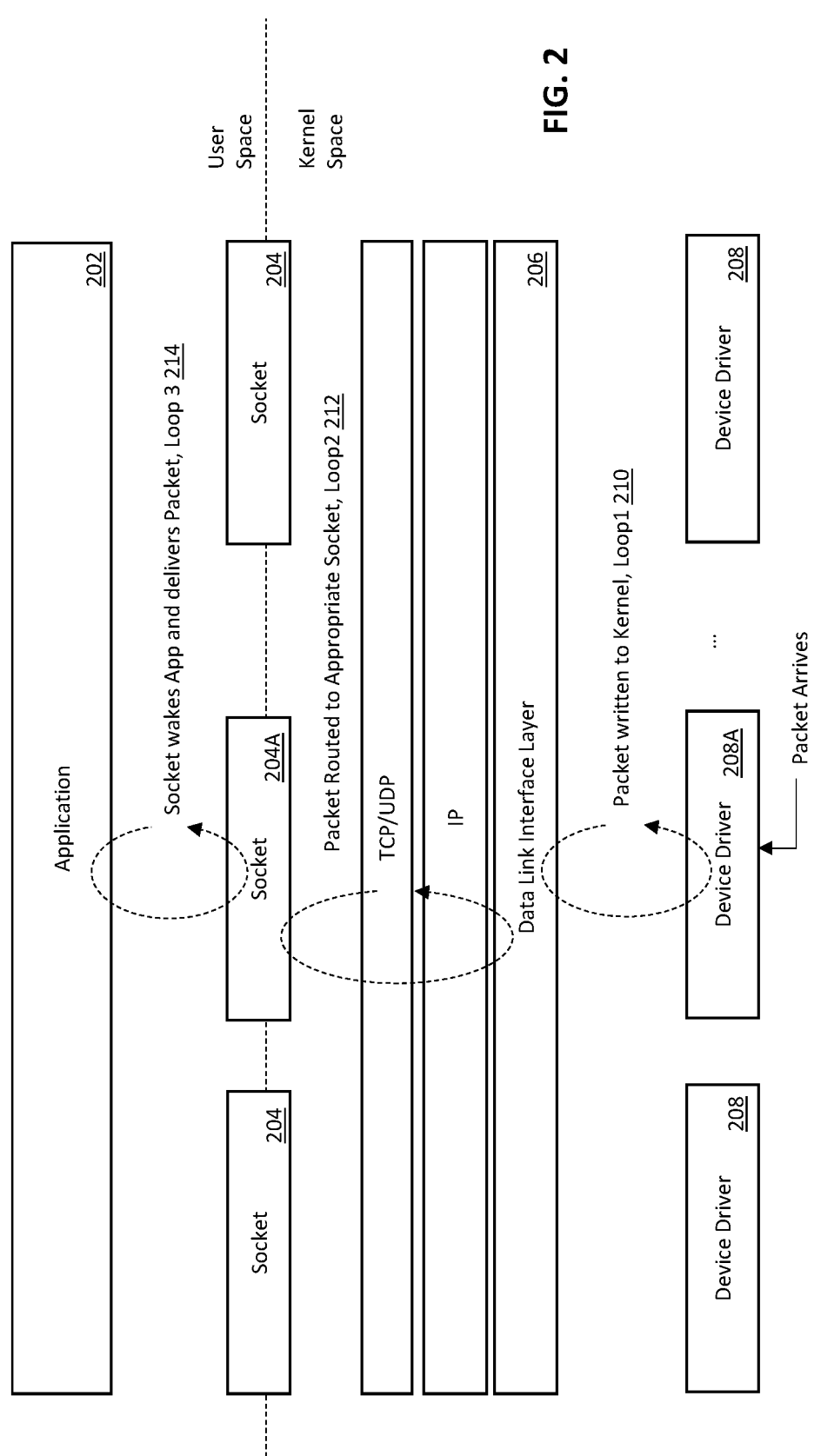
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
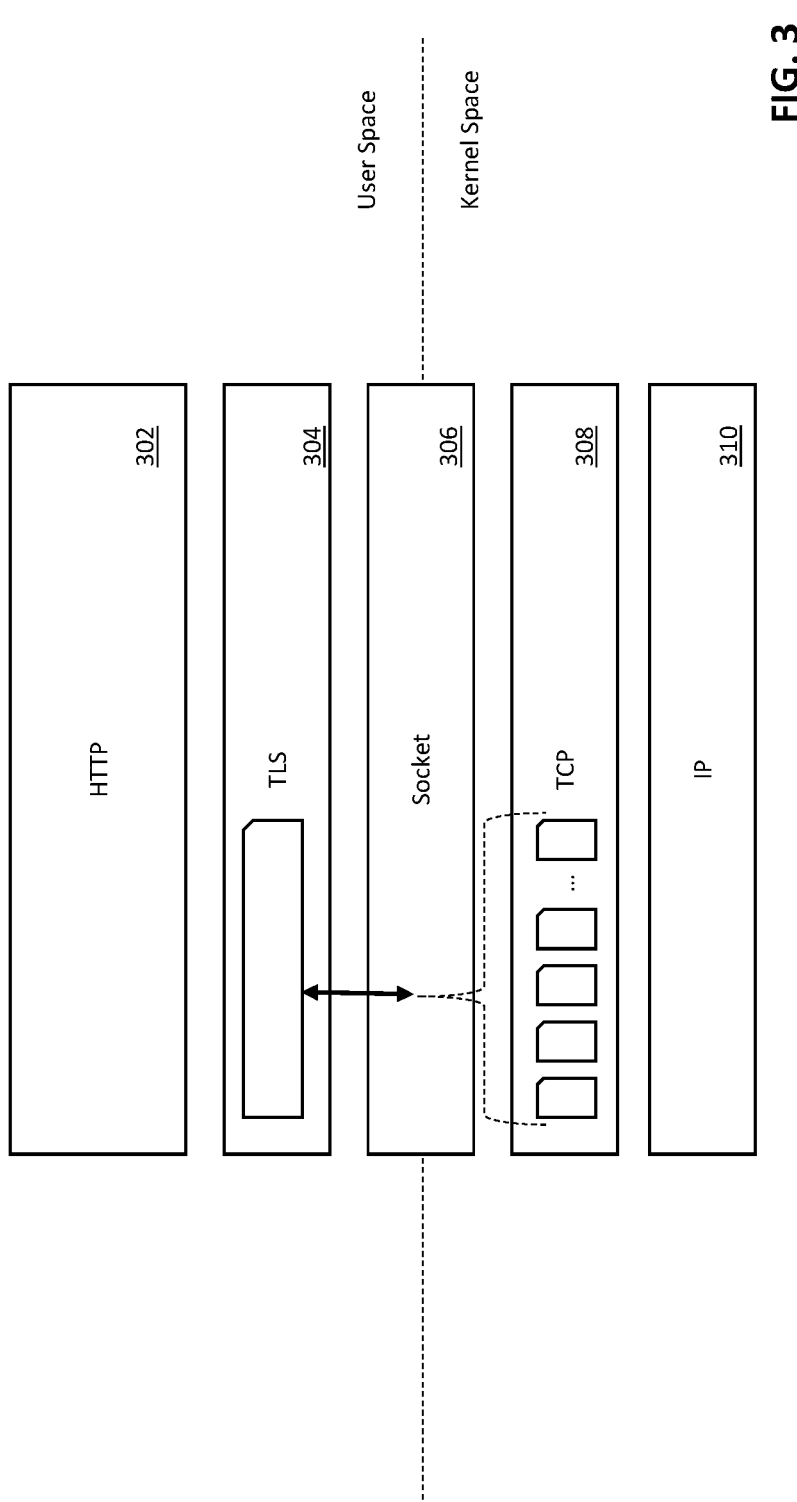
FIG. 3 is a block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
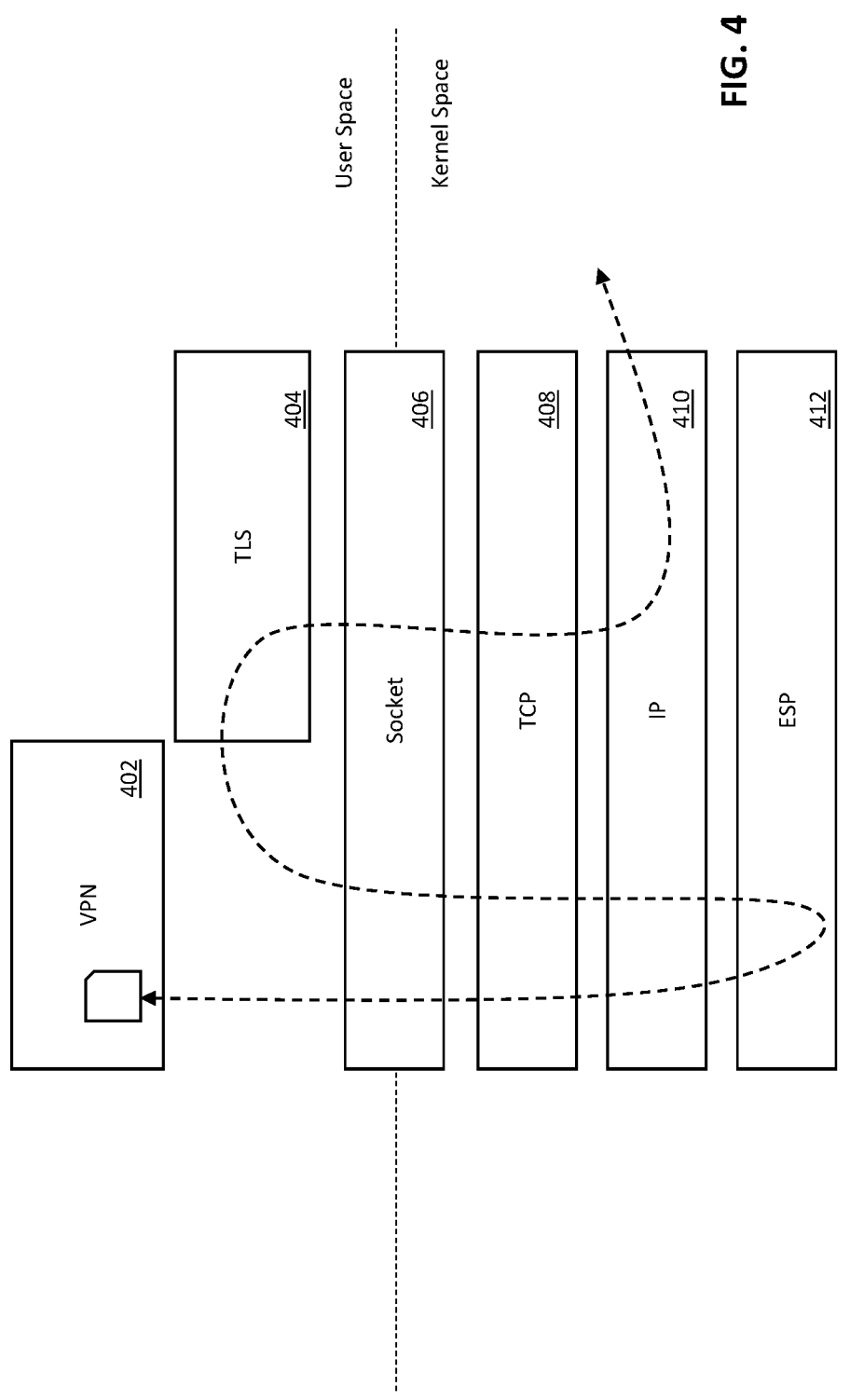
FIG. 4 is a block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
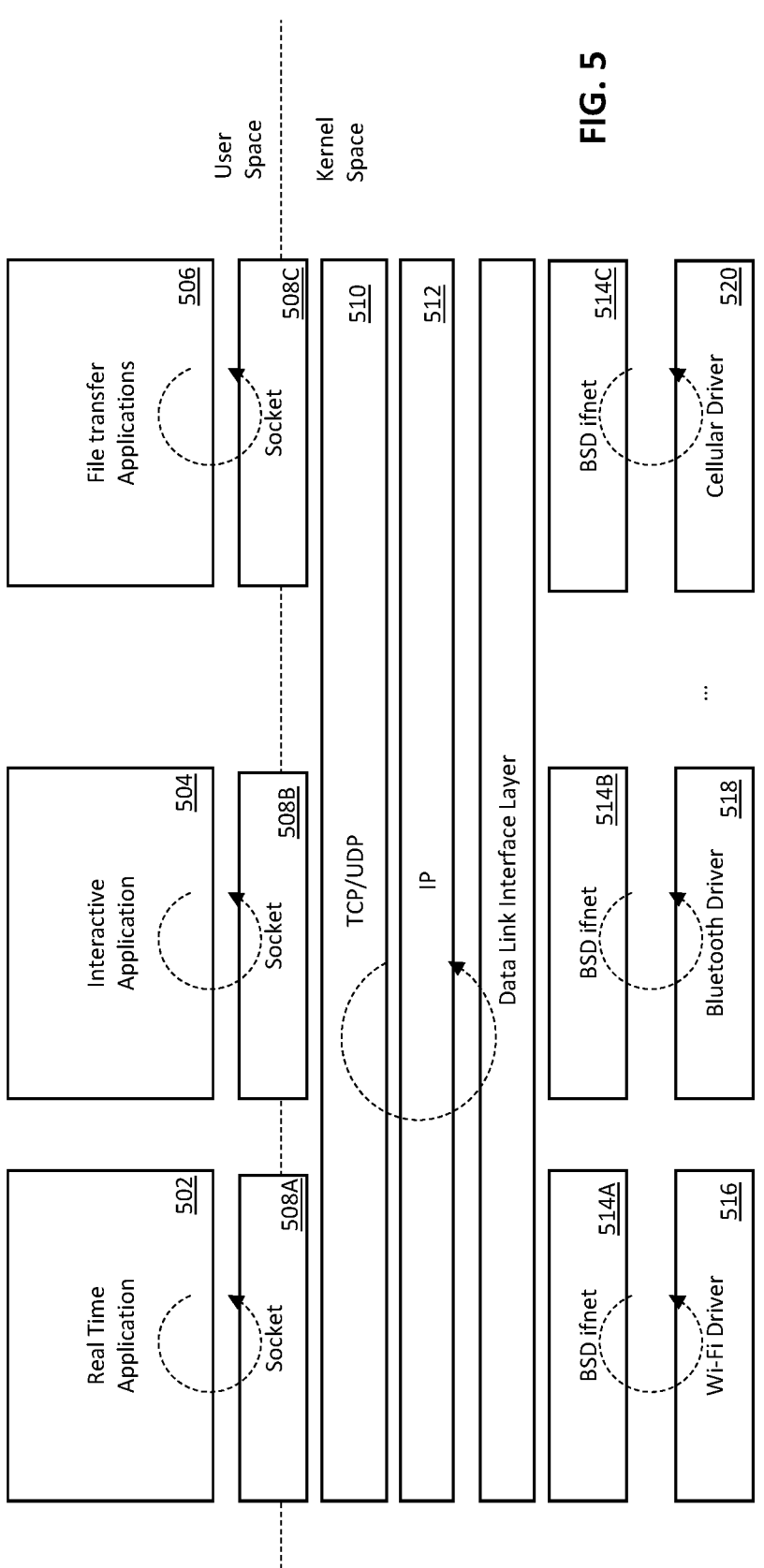
FIG. 5 is a block diagram of an exemplary implementation of application-based tuning, useful to explain various other workload optimization complexities of emerging use cases.

FIG. 5 illustrates a logical block diagram of an exemplary implementation of application-based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention-based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mice). Cellular network technologies 520 often provide non-contention-based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multithreaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses, or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary User Space Networking Architecture—

A networking stack architecture and technology that caters to the needs of non-kernel-based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

The user space networking stack architecture provides an efficient infrastructure to transfer data across domains (user space, non-kernel, and kernel). Unlike the traditional networking paradigm that hides the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket-based communication. Additionally, direct transfer can improve observability and accountability with traffic monitoring.

Figure 6:
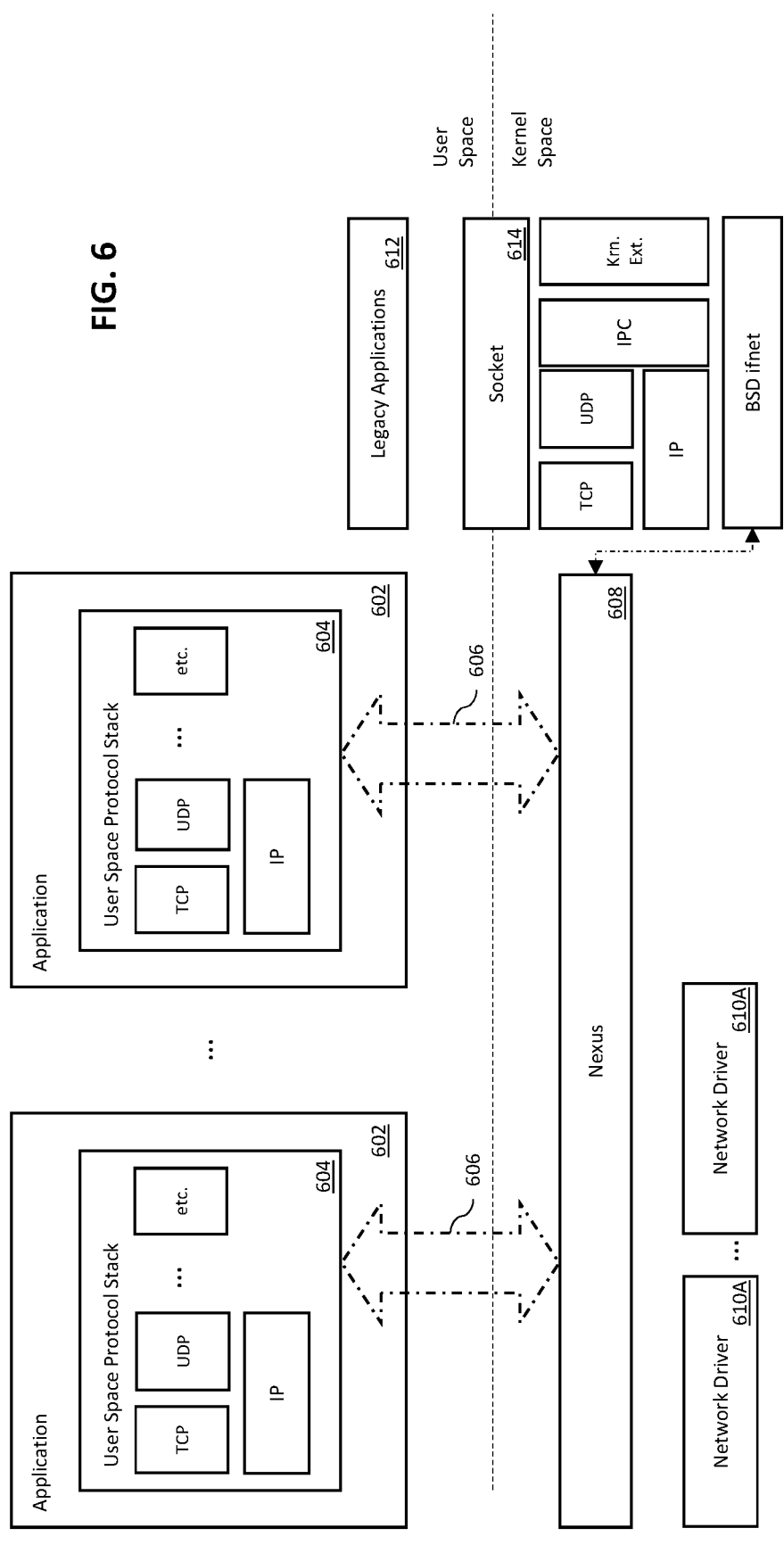
FIG. 6 illustrates one logical representation of an exemplary user space networking stack architecture, in accordance with the various aspects of the present disclosure.

FIG. 6 illustrates one logical representation of an exemplary user space networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally, shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary User Space I/O Infrastructure

In one embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor-based object, rather than as data. In order to access the data, the process de-references the file descriptor for direct access to the shared memory within kernel space. In one such implementation, the file descriptor-based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security-based information (e.g., cyclic redundancy checks (CRC), parity, etc.).

In one embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

In one embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology-based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket-based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket-based access. For example, user application networking space may be more heavily weighted to improve overall performance or functionality, whereas legacy socket-based access may be preferred where legacy applications are preferentially supported.

Exemplary Network Extensions

In one embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

Exemplary User Space Networking Stack

Figure 7:
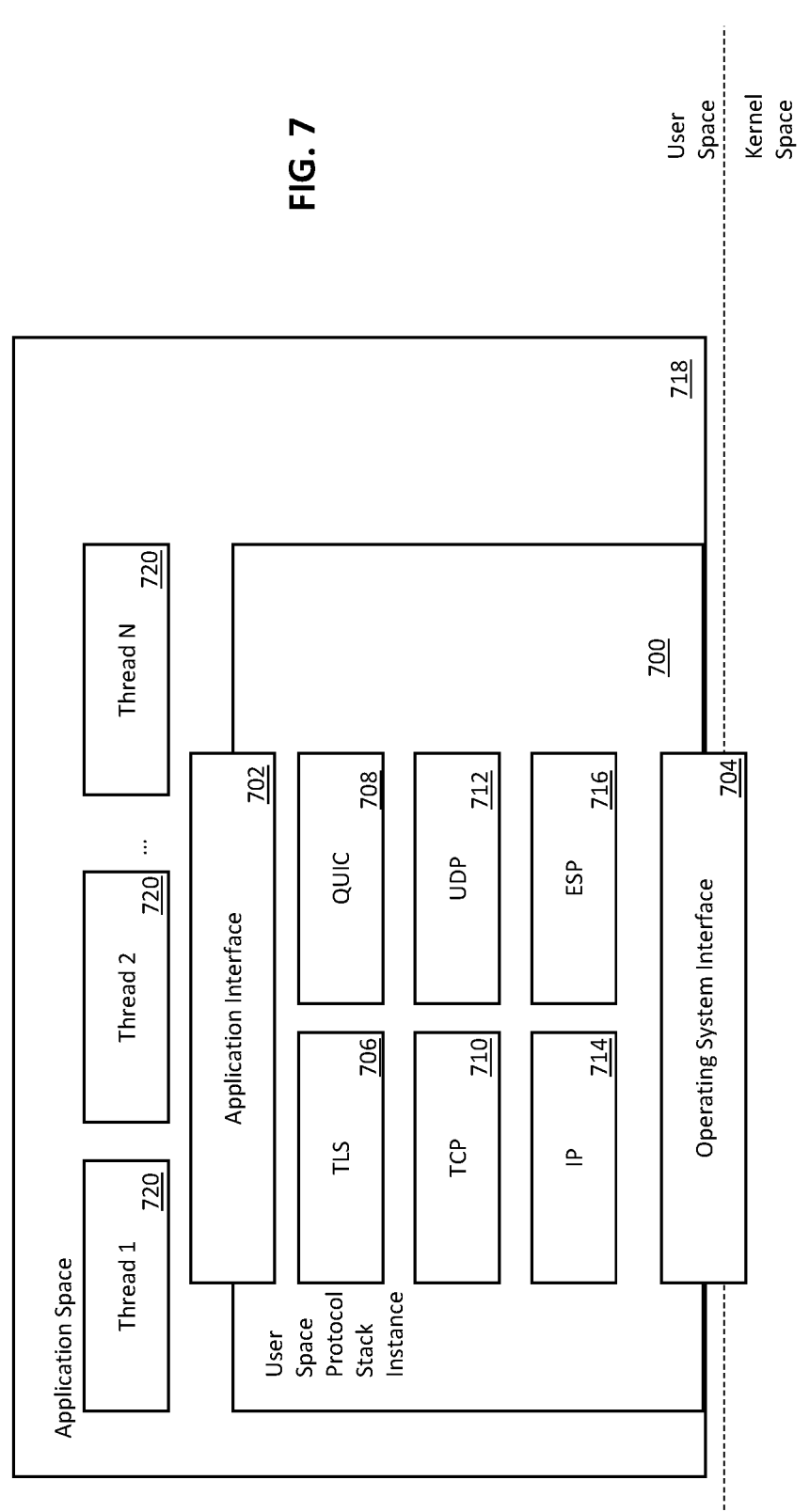
FIG. 7 is a block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Emerging Use Case Support—

Figure 8:
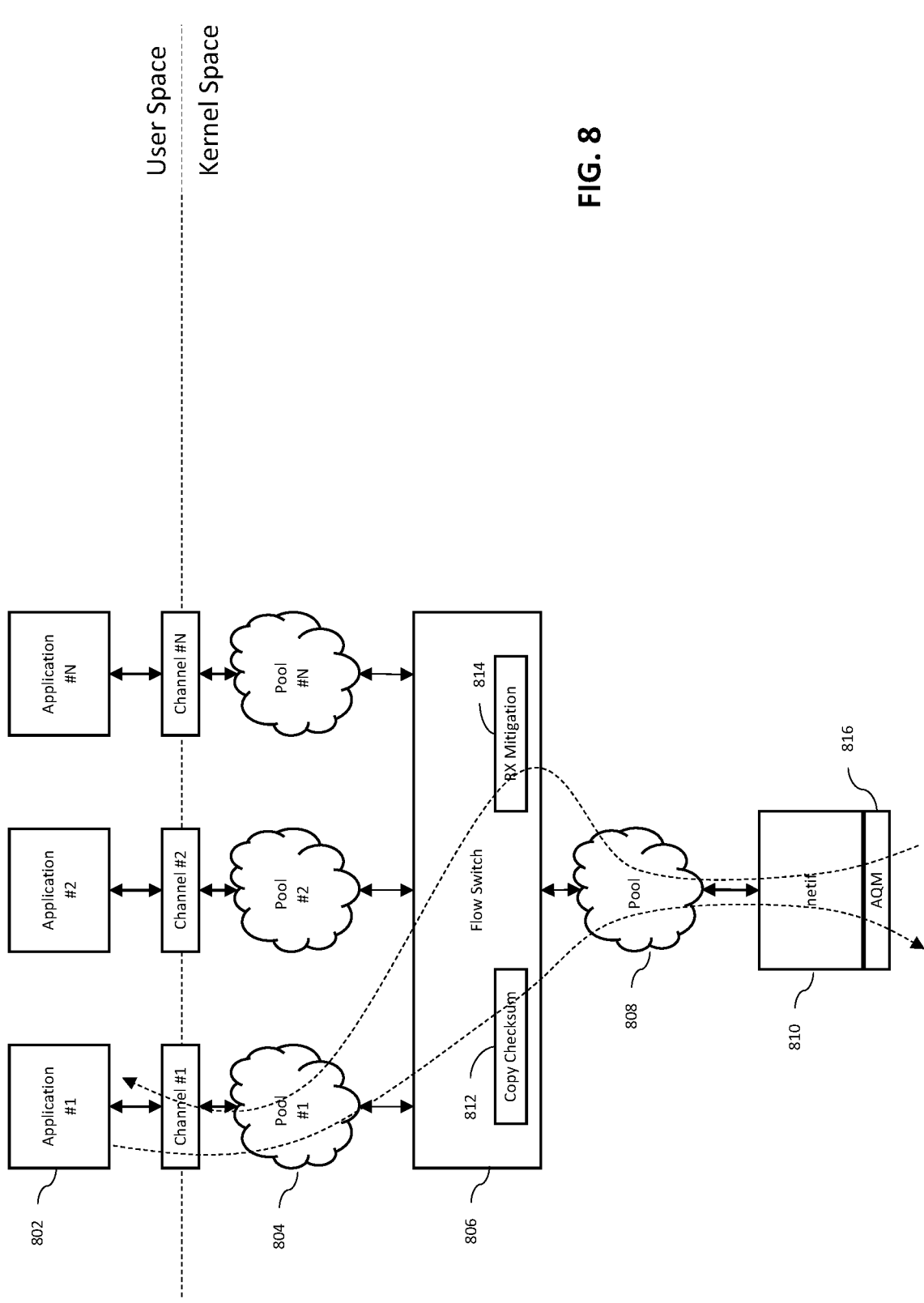
FIG. 8 is a block diagram of packet flow in accordance with the aforementioned user space networking architecture.

FIG. 8 is a logical block diagram of packet flow in accordance with the aforementioned user space networking architecture. In the illustrated packet flow, the user space application 802 writes packets for transfer into a user packet pool 804. After context switching to kernel space, the flow switch 806 performs copy-checksum to move the user space packets into the driver pool 808 and the driver (netif) 810 can transact data directly from the driver pool 808. Notably, the aforementioned process greatly reduces context switching between user space and kernel space.

The exemplary user space networking architecture provides some general-purpose networking functionalities under the assumption that commonly performed techniques are more efficiently handled as operational overhead. For example, as shown in FIG. 8, the user space networking architecture provides e.g., copy-checksum logic 812, receive mitigation logic 814, and active queue management (AQM) logic 816.

Copy-checksum logic 812 is described in e.g., U.S. patent application Ser. No. 16/365,484 filed on Mar. 26, 2019 and entitled "Methods and Apparatus for Virtualized Hardware Optimizations for User Space Networking" previously incorporated supra. As described therein, the "copy-checksum" is presented to the user space protocol stack as a virtualized network port that provides e.g. hardware accelerated checksum offloading. While copy-checksum is slightly more computationally expensive than a copy-only; the combined copy-checksum is much cheaper than existing software-based checksums which perform the copy and checksum separately.

Similarly, receive mitigation logic 814 is described in U.S. patent application Ser. No. 16/146,533 filed Sep. 28, 2018 and entitled "Methods and Apparatus for Regulating Networking Traffic in Bursty System Conditions", previously incorporated supra. Notably, the techniques described therein reduce intermittent bursts of very large amounts of data (e.g., 10 Gb/s) with a reducing ring buffer to smooth out the transfer of bursty data.

Active queue management (AQM) logic 816 is described in U.S. patent application Ser. No. 16/368,368 filed on Mar. 28, 2019 and entitled "Methods and Apparatus for Active Queue Management in User Space Networking", previously incorporated supra. As described therein, the user space networking stack can implement AQM to prevent buffer bloat conditions intelligently based on which flows should be preserved and/or which flows can be culled. More directly, by intelligently selecting AQM culling based on application considerations, the user space networking stack can benefit from both AQM as well as flow priorities.

As previously alluded to, $3^{rd}$ party application developers need a way to read/write/modify data packets at e.g., the various logical layers of the software stack. To these ends, various embodiments described herein enable different types of packet manipulation at e.g., the Ethernet layer (DLL), Network Layer (IP), and/or Transport Layer (TCP). More generally, the various principles described herein enable closely coupled user space packet processing with the hardware and/or kernel space network interface.

Custom Packet Types—

As a brief aside, $3^{rd}$ party application developers often use proprietary and/or custom data processing techniques that are tailored to their specific use case. As but one such example, consider a custom $3^{rd}$ party camera application that has modified its packet payloads to hold substantially larger image data. Another common example may be a custom $3^{rd}$ party application that utilizes an unusual network addressing format. It would be impractical/infeasible to support arbitrary data path processing in the general-purpose data path. Ideally, custom data path processing should be kept separate and distinct from general-purpose packet processing (or at least until the customizations have matured and/or gained wide adoption).

As used herein, the term "custom" refers to data structures and/or data structure processing that is limited to a specific application or use case. Unlike traditional networking stack implementations, the various embodiments of the present disclosure handle custom packet processing in user space (during packet formation and/or packet processing) and custom packet routing in kernel space within an isolated memory footprint (during packet transmission and/or reception). More directly, custom packet processing is not performed in kernel space via kernel extensions (kexts) and custom packet data structures are segregated into custom packet pools (rather than global mbuf space). The physical isolation and/or distinct custom handling mechanisms ensure that potentially insecure and unstable custom packet processing is isolated from kernel operation.

In one embodiment, the user space networking stack includes logic that explicitly registers custom packet types and/or associated custom packet processing. In one exemplary embodiment, the registration process includes the definition of a unique identifying type field. For example, registration of a custom ethernet layer data structure includes the definition of a custom ethertype. Similarly, registration of a custom IP layer data structure includes the definition of a custom IP type, and registration of a custom transport layer data structure includes the definition of a custom transport type. Registration may identify the prerequisites for supporting custom packet processing (e.g., minimum memory space requirements, processing requirements, and/or network bandwidth minimum/maximums). Various other operational aspects may also be satisfied during registration; e.g., authentication, authorization, and/or other access control mechanism, etc.

In some embodiments, the user space application may request and/or register a new custom type field. Custom types may be stored within a custom type registry. So long as the requested custom type field is permissible, the kernel may add the registry entry. In other embodiments, the custom identifier may be requested by the user space application but generated by the kernel; for example, the user space application may request the generation of a new ethertype format, the flow switch may identify an ethertype value that is not already in use or otherwise reserved. Still other variants may be externally defined; e.g., a $3^{rd}$ party application developer request a custom type from the device manufacturer via a formalized submission process, the device manufacturer may propagate the supported custom types via a software update/firmware patch.

Notably, "permissibility" may be determined based on known/defined restrictions. For example, the type identifier may need to be e.g., uniquely identifiable, not already in use/reserved, and/or comply with other format requirements (limited ranges, sizes, etc.) For example, a custom application cannot claim ethertype value 0x0800 which is already reserved for IPv4 packets and/or propose an ethertype that is larger than two octets. Similarly, a custom IP data type cannot claim a protocol that is already in-use/reserved (e.g., ICMP, TCP, UDP etc.) and/or incorrectly sized, etc.

Registration with the custom type registry may include one or more of: definition, addition, removal, modification, and/or prioritization of custom packet processing rules. Common examples of packet processing rules include rules for formatting, packet handling, and/or data structure manipulations. For example, the custom packet format rules may define header/footer size, payload size, metadata formats, error checking/correction, and/or other common formatting considerations. Examples of custom packet handling rules may include e.g., forwarding, replying, duplication, broadcasting, multicasting, authentication, validation, verification, network congestion handling, buffer handling, buffering sizes, and/or any number of other packet routing techniques. Examples of packet manipulation rules may include e.g., truncation, masking, padding, error correction, error detection, checksum, parity, and/or other forms of packet manipulation. More generally, artisans of ordinary skill in the related arts will readily appreciate that any number of specialized packet processing techniques may be defined, consistent with the principles described herein.

Figure 9:
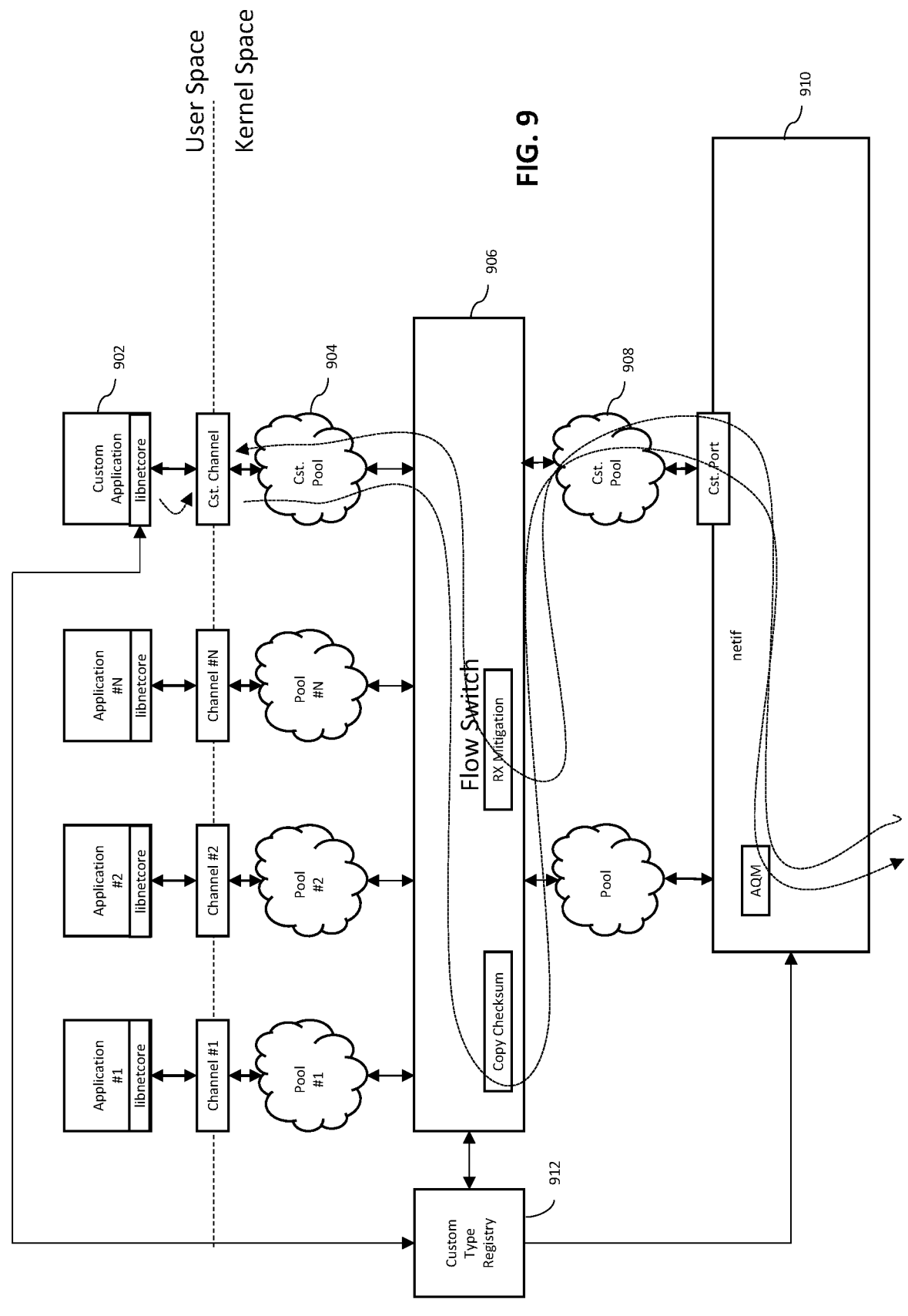
FIG. 9 is a block diagram of custom packet flow in accordance with the exemplary custom user space networking architecture.

Referring now to FIG. 9, a logical block diagram of custom packet flow in accordance with the exemplary custom user space networking architecture is shown. The custom user space networking architecture supports custom user space applications 902 via custom user space packet pools 904, and custom driver space packet pools 908. The flow switch 906 and user space application 902 can reference a custom type registry 912 to define, negotiate, configure, and/or retrieve custom packet processing rules. Once agreed upon, the custom packet processing rules are disseminated to either/both of the custom application 902 and/or the network interface 910.

In one exemplary embodiment, the custom application 902 includes a library that uses the custom packet processing rules to generate custom packet data structures in user space. Notably, the custom packet processing rules can be executed from user space without kernel extensions (kexts); as a practical matter, this obviates context switching associated with kext operation and ensures that unstable, unsecure, and/or immature packet processing is limited to just the custom application's provenance.

As but one example, custom packets may be based on a custom ethertype. The custom ethertype interface defines how the user space library of the custom application 902 (libnetcore) should construct a custom ethernet packet. For example, the custom ethertype definition may specify the full ethernet header and/or packet structure. Common examples of ethernet fields include without limitation:

ethertype, destination and source medium access control (MAC) addresses, payload data (which may include headers for other protocols such as TCP/UDP/IP), and a frame check sequence (32-bit cyclic redundancy check (CRC)). As another example, the custom packets are based on a custom IP type. The custom IP definition is used where the user space libnetcore constructs a custom IP packet instead of the normal TCP/UDP/IP packets. Still other examples may enable custom transport layer data structures.

In one exemplary embodiment, the network interface 910 in kernel space also receives packet processing rules. The network interface 910 can be modified to handle custom packets differently; custom packet processing rules may be defined for discovery, flow registry, channel allocation, address allocation (IPv6, etc.), channel creation, send/receive processing, and/or security enforcement (spoofing prevention.) Moreover, even though the network interface 910 is a kernel space process, the bounded nature of custom driver pool 908 ensures that any custom packet processing insecurity and/or instability is limited to the customized driver pool 908. Adverse behavior and/or malicious attacks cannot expand beyond the custom driver pool 908; moreover, the kernel can remedy unwanted behavior by purging the custom pools 904/908. This is a substantial improvement over the traditional kernel space networking that use an undifferentiated global mbuf pool; unstable kext operation within the global mbuf pool would result in catastrophic failure.

Referring back to FIG. 9, during custom operation, an exemplary user space application 902 writes custom packets for transfer into a custom packet pool 904. After context switching to kernel space, the flow switch 906 performs copy-checksum to move the custom user space packets into a custom driver pool 908 and the driver (netif) 910 can transact data directly from the custom driver pool 908. Each of the custom memory allocations is separate and distinct from general-purpose packet allocations; in some variants, custom memory allocations can be parameterized for different sizes, segmentation, access considerations, etc.

While the illustrated packet flow of FIG. 9 is shown with support for e.g., copy-checksum, receive mitigation, and/or active queue management (AQM), artisans of ordinary skill in the related arts will readily appreciate that custom packet handling may add, remove, and/or customize general-purpose packet processing. For example, custom packet formats may use a different copy-checksum hash than the checksum employed by traditional TCP/IP packet processing, different schemes for receive mitigation, and/or buffer sizes for AQM support.

The foregoing discussion presents various illustrative embodiments of the present disclosure, still other variations thereof may be substituted with equal success, by artisans of ordinary skill in the related arts given the contents of the present disclosure.

Custom Packet Processing—

Not all emerging use cases can be demarcated with custom data types. An entire category of emerging use cases is specifically focused on broad-based packet processing. Historically, device manufacturers have exposed "kexts" (kernel extensions) to e.g., support system-wide network frameworks; common examples of such system network use cases include without limitation: packet filtering and network interface filtering. Unfortunately, if a kext crashed (or was attacked), then the entire kernel space was compromised. For this reason, minimizing unsecure and unstable kext operation is a high priority for consumer electronics manufacturers (such as the Assignee hereof).

To these ends, improved techniques to facilitate safer and more secure system-wide networking operations are needed. Specifically, various embodiments described herein provide user space alternatives to legacy kext functionality.

Figure 10:
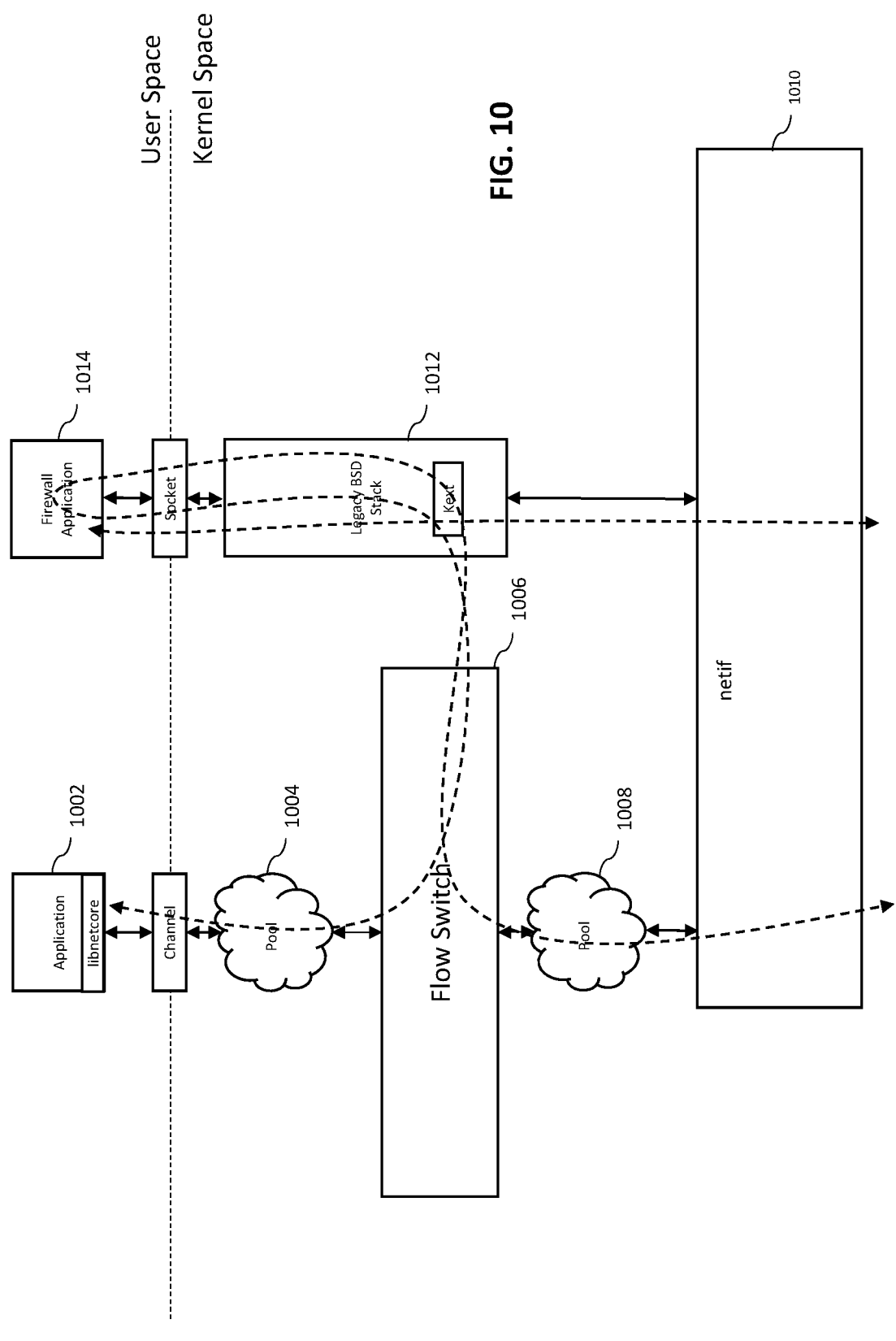
FIG. 10 is a block diagram of intermediary packet processing via kernel extensions (kexts) in accordance with the aforementioned user space networking architecture.

For example, consider the $3^{rd}$ party firewall application depicted in FIG. 10. As shown therein, the firewall application 1014 inspects all packet traffic (system-wide) into and out of the device to identify malicious activity. Data packets from the user space application 1002 are written into the user packet pool 1004 and redirected via the flow switch 1006 to the legacy kernel space (BSD) network stack 1012 which uses the kernel extension for firewall access. The data is provided (via the socket-based interface) to the firewall application 1014. If the data is acceptable, it is re-routed back out through the flow switch 1006 to the driver pool 1008 and network interface. Inbound packet data as well as legacy BSD data is routed similarly. As illustrated in FIG. 10, the reliance on legacy kernel space extensions (kexts) greatly hampers network operation; in fact, all the benefits of the aforementioned user space networking architecture are wasted when data is re-routed through the legacy kernel space networking stack and/or kernel extensions.

Figure 11:
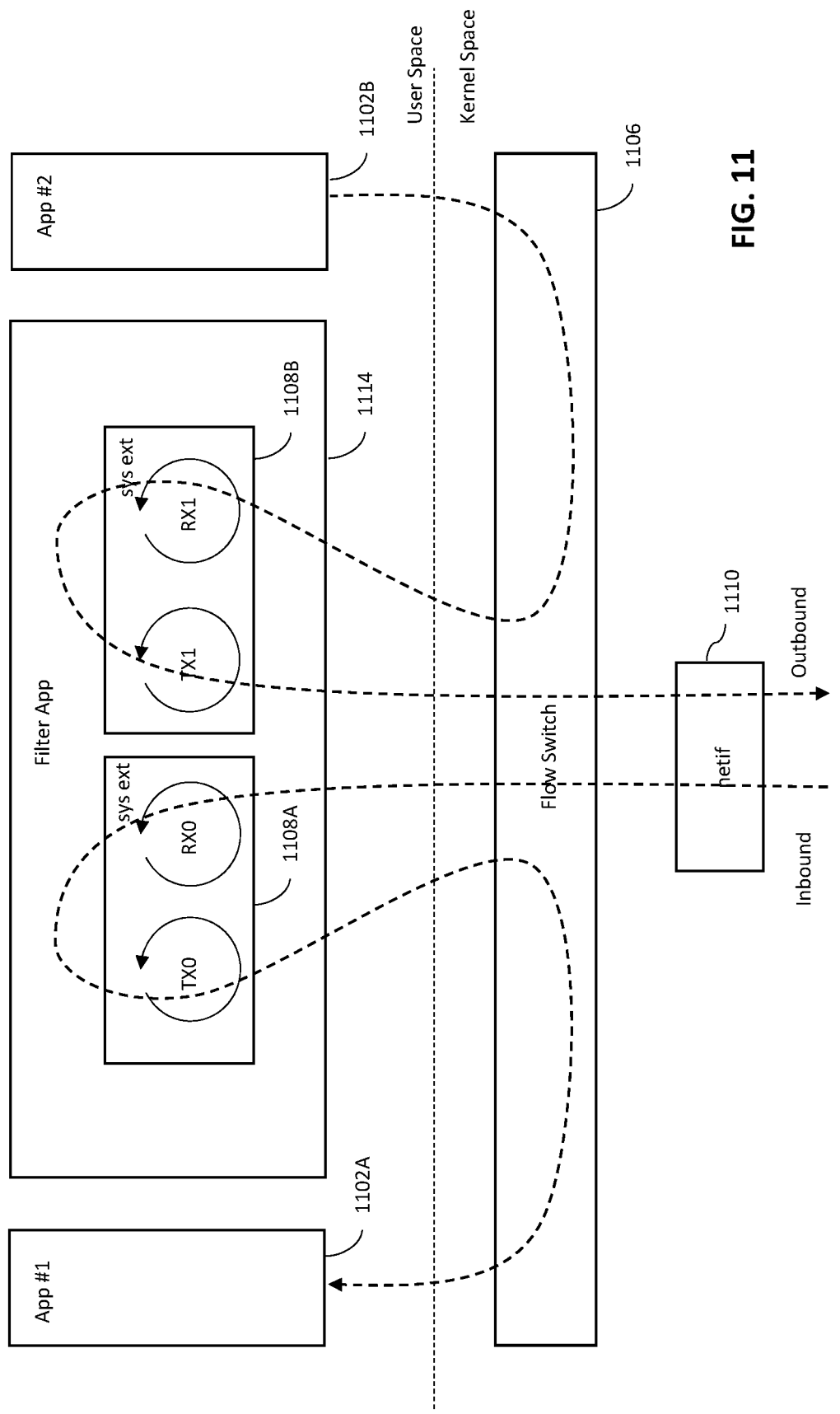
FIG. 11 is a logical flow diagram of a custom packet processing with system extensions, in accordance with various aspects of the present disclosure.

FIG. 11 is a logical flow diagram of a custom packet processing with system extensions, in accordance with various aspects of the present disclosure. As shown in FIG. 11, user space applications (1102A, 1102B) can transmit (outbound) and/or receive (inbound) packets via the flow switch 1106 (user packet pools are not shown), however the flow switch 1106 copies the packet traffic to the intermediary application 1114 prior to delivery to the network interface 1110. The intermediary application 1114 performs packet processing via user space system extensions 1108; in this example, the intermediary application 1114 is a firewall application that verifies that the copy of the packet is legitimate. Other types of intermediary applications (packet sniffing, activity tracking, advertisement, $3^{rd}$ party proprietary networks, etc.) may be substituted with equal success, given the contents of the present disclosure.

Notably, the foregoing implementation exposes kext-like functionality on copies of packets such that the original packet data is not directly exposed to the intermediary application 1114. In some cases, packet copies are preferable to directly operating on packets (e.g., a zero-copy architecture), such that crashes can be gracefully handled. In other words, even if the filter application 1114 crashes, the original packets are left uncorrupted. In this manner, only the crashed application 1114 is affected, as opposed to the entire kernel process or another user process. In other implementations, the intermediary application 1114 may receive the original packets; such implementations may be preferable where instability/security is less of a concern and/or where memory footprint is a design constraint.

In one embodiment, the user space system extensions are based on ring data structures. In one exemplary embodiment, each system extension is associated with two (2) rings: a transmit ring, and a receive ring. Data to be processed by the and/or user space intermediary application 1114 is written into the receive ring. As data is processed by the intermediary application 1114, the resulting output is written to the transmit ring. Other implementations may use other forms of data structures, the following discussion of ring buffer operations being purely illustrative. Common examples of such data structures include without limitation: tables, arrays, lists, hash tables, etc.

For example, in the illustrated embodiment, inbound data is received from the network interface 1110, and written into its driver pool (not shown); the flow switch 1106 copies the inbound data to the receive ring (RX0) of a first system extension 1108A of the filter application 1114. In one exemplary embodiment, the filter application is only provided with a read-only copy of the packet (the filter application cannot re-write the packet). If the read-only packet is successfully verified by the filter application 1114 as being legitimate content, then the read-only copy is written into the transmit ring (TX0) of the first system extension 1108A. Thereafter, the flow switch 1106 can route the verified packets to its destination application 1102A.

Similarly, outbound data is generated by the user space application 1102B and written into its user packet pool (not shown); the flow switch 1106 copies the outbound data to the receive ring (RX1) of a second system extension 1108B of the filter application 1114. As noted above, the filter application may be limited to a read-only copy of the packet. If the read-only packet is successfully verified by the filter application 1114 as being legitimate content, then it is copied into the transmit ring (TX1) of the second system extension 1108B. Thereafter, the flow switch 1106 can route the original packets to the network interface 1110 for delivery.

While the foregoing example is described in the context of read-only access, other variants provide read-only, read/write, or some other variant of access to the system extension. Similarly, while the aforementioned discussion is presented in the context of monitoring packets from user space networking applications (1102A, 1102B), the filter application 1114 may additionally monitor legacy kernel space networking traffic. For example, the BSD global mbuf pool may be serviced via the aforementioned ring structures.

Moreover, the foregoing implementation is described in the context of a first set of inbound rings which copy all inbound traffic, and a second set of outbound rings which copy all outbound traffic. Still other variants may substitute and/or hybridize data structures so as to accomplish other design objectives; for example, alternative implementations may dedicate data structures for data paths; for example, a $3^{rd}$ party proprietary network application may use a system extension that provides one ring for all inbound traffic into the proprietary network, and a second ring for all outbound traffic from the proprietary network. Other variants may be substituted by artisans of ordinary skill, given the contents of the present disclosure.

Figure 12A:
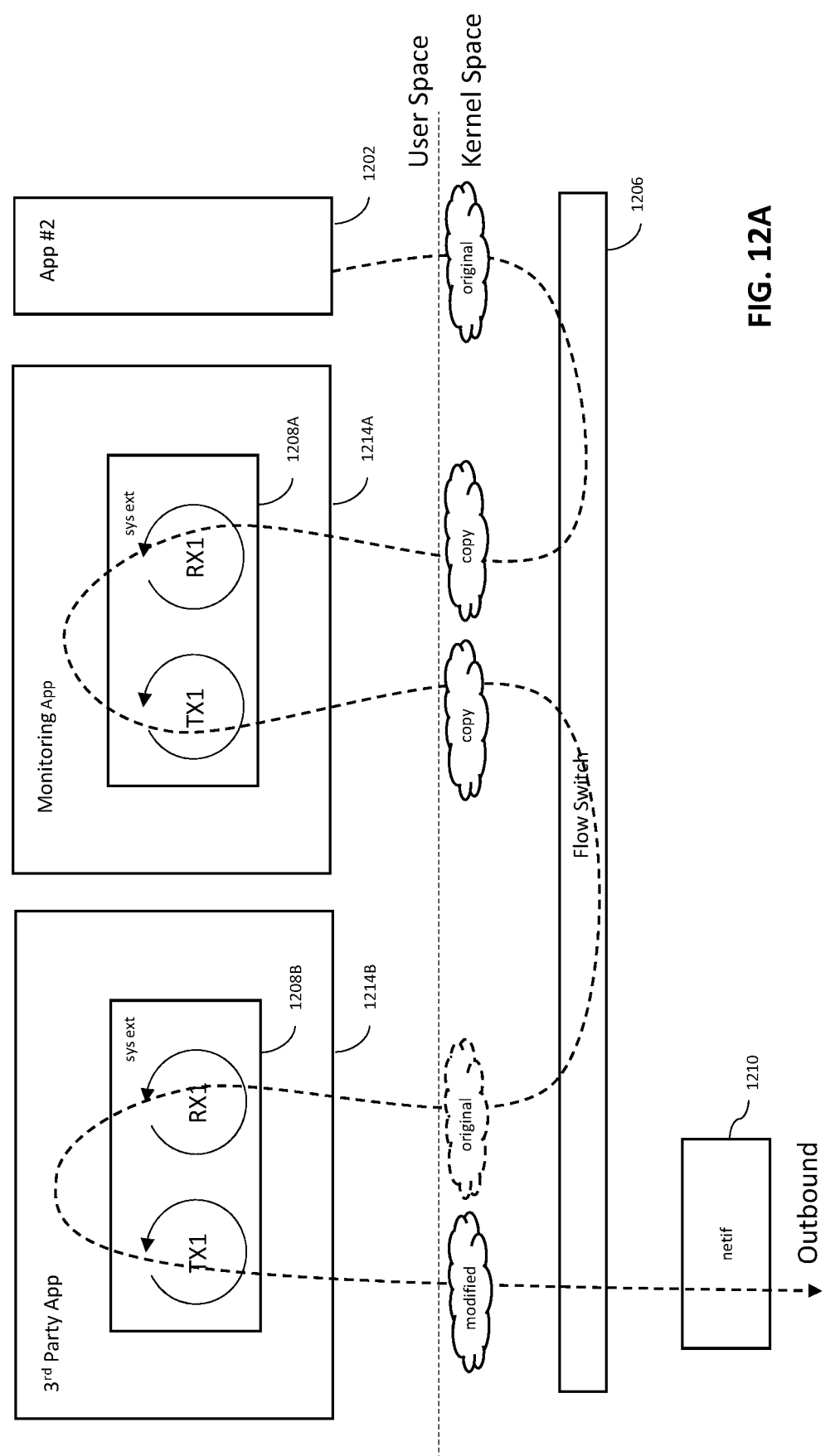
FIGS. 12A-12B are graphical representations of crash recovery, consistent with the various principles of the present disclosure
Figure 12B:
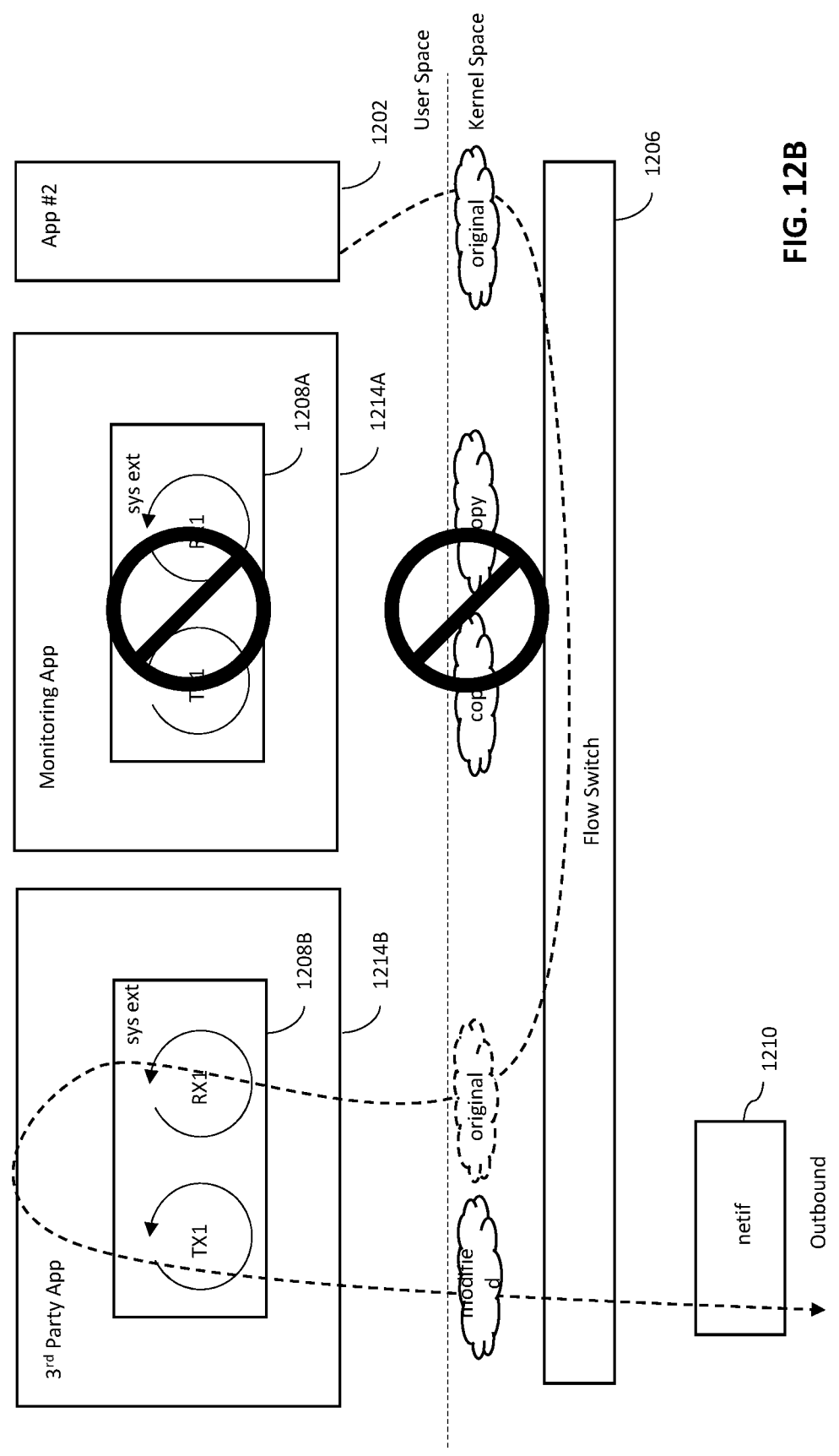

Turning now to FIGS. 12A and 12B, graphical representations of crash recovery are described in greater detail, consistent with the various principles of the present disclosure. Consider a user space application 1202 transmitting data which is cascaded through a $3^{rd}$ party monitoring software 1214A and a $3^{rd}$ party proprietary network 1214B. While the following discussion is presented in the context of two (2) intermediary applications, higher order (more than two) and/or more complex topologies (any combination of cascaded and/or parallelized topologies) may be substituted with equal success, the discussion herein being purely illustrative.

As shown in FIG. 12A, the user space application 1202 generates outbound traffic; the outbound traffic is written into a user packet pool (original). The flow switch 1206 generates a read-only copy (copy) that is written into the receive ring of system extension 1208A of the monitoring application 1214A. Each data packet that is successfully verified is written to the transmit ring of system extension 1208A. Data packets that fail verification may be deleted (with or without notification to higher layer software).

Subsequently thereafter, the flow switch 1206 copies the data packets from the transmit ring of system extension

1208A, to the receive ring of system extension 1208B, of the $3^{rd}$ party proprietary network 1214B.

The 3rd party proprietary network 1214B translates each data packet to a proprietary address and writes the packet to the transmit ring of system extension 1208B. In this implementation, the $3^{rd}$ party proprietary network 1214B may write a modified pool of data packets so as to insert the appropriate proprietary network addressing. More trusted system extensions may support read/write access to the original packet pool; similarly, less trusted system extensions may use other schemes (e.g., duplicative packet pools, etc.) so as to maintain original packet data, etc.

Notably, in the foregoing topology of FIG. 12A, different user space system extensions may have different permissions and/or different functionalities. In other words, the intermediary application may be granted different permissions depending on how secure (or insecure), stable (or unstable), etc. In some cases, these permissions may rely on external certification; for example, the device manufacturer may only sign read/write certifications for mature $2^{nd}/3^{rd}$ party vendors and/or developers.

Referring now to FIG. 12B, the foregoing system gracefully recovers during a crash. As shown therein, the monitoring application 1214A has crashed due to an instability (or disabled due to unpermitted or malicious activity). In FIG. 12B, the monitoring application 1214A and its corresponding memory allocations are disabled; the $3^{rd}$ party proprietary network application 1214B is entirely isolated from the instability. Specifically, the flow switch 1206 copies the data packets from the original packet pool to the receive ring of system extension 1208B, of the $3^{rd}$ party proprietary network application 1214B. The $3^{rd}$ party proprietary network application 1214B operates as described supra.

The foregoing discussion presents various illustrative embodiments of the present disclosure, still other variations thereof may be substituted with equal success, by artisans of ordinary skill in the related arts given the contents of the present disclosure.

Methods

Figures 13A, 13B:
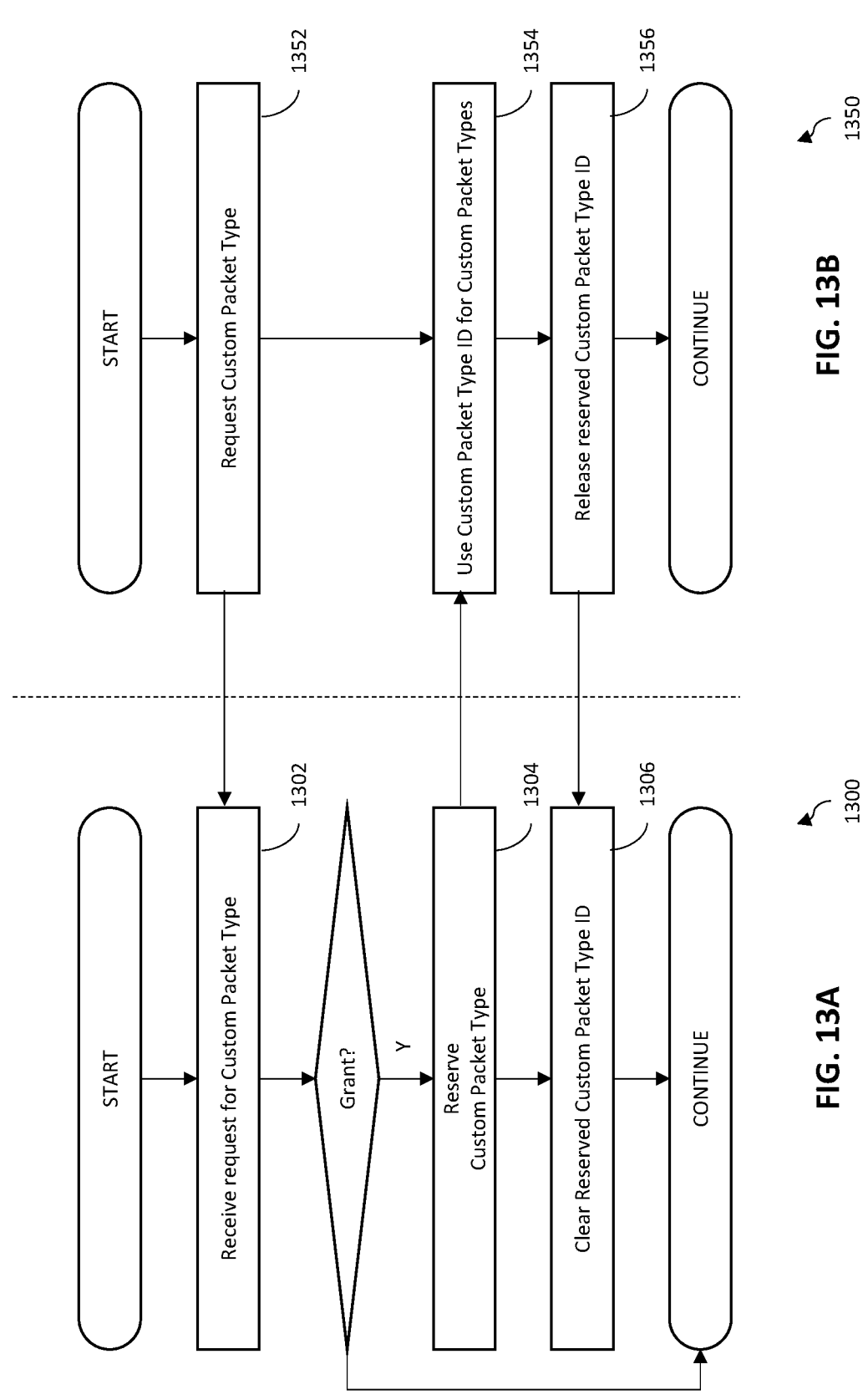
FIGS. 13A-13B are logical flow diagrams of exemplary methods for registering custom packet data structures, in accordance with the various principles described herein.

FIG. 13A is a logical flow diagram of an exemplary method 1300 for registering custom packet data structures, in accordance with the various principles described herein.

At step 1302 of the method 1300, a kernel space entity receives a request for a custom packet type. In some embodiments, the request may be received via a user space application via an application programming interface (API) call. In other implementations, the kernel space entity may proactively assign and/or provide custom packet types. In some such cases, custom packet types may be provided transparently to the user space applications. For example, legacy support for certain kernel extensions (kexts) may be monitored by a flow switch. In situations where data traffic would benefit from streamlined custom packet processing, the flow switch may automatically switch to custom packet processing based on the parameters used in the legacy kext. In other cases, the kernel may suggest optimization options to the user space application; the user space application can ignore, accept, or decline the suggestion. As another such example, certain $3^{rd}$ party services may require a user to accept a custom packet type to enjoy their provided services. In such implementations, the user may "opt-in" to the service by installing custom packet type definitions/operation.

In one embodiment, the kernel space entity manages data flows between logical entities e.g., user space applications, non-kernel space applications, network interface drivers, etc. The kernel space entity may consult a custom data type registry to determine custom data structure format, custom handling, custom routing, and/or any other customized processing (e.g., validation, verification, flow control, etc.) More broadly however, artisans of ordinary skill in the related arts will readily appreciate that any appropriately privileged entity (kernel and/or non-kernel) may access and/or modify the custom data type registry. As but one such example, an exemplary legacy BSD network stack may access the custom data type registry to enable legacy support for custom protocols. As but another example, non-kernel space applications may have read-only access (or other appropriately limited access) to the custom data type registry to identify currently supported custom packet types (e.g., to prevent registration of duplicate custom packet types, etc.)

Requests for custom packet types may include information, metadata, and/or operational parameters for the registration process. In one embodiment, the registration request may include identifying information for the source, destination, and/or originating process. For example, a user space application may identify itself (the originating process), an endpoint server (the destination), and/or its own network address (the source). In another such embodiment, the registration request may specify operational parameters the custom packet type (e.g., ethertype, IP type, transport type, etc.), custom packet processing rules (e.g., format requirements, protocol treatment, etc.), and/or resource usage (e.g., minimum memory space requirements, processing requirements, and/or network bandwidth minimum/maximums). The foregoing parameters may be used by the kernel space entity to e.g., allocate resources, monitor how custom packet types are used, and/or limit resource utilization and/or access to the custom packet type.

Referring back to the method 1300 of FIG. 13A, the custom packet type can be reserved for use in a custom packet type registry when the request is granted (step 1304), otherwise the method 1300 ends and the requesting application is notified to fall back to existing packet types. In other embodiments, the method 1300 may postpone the grant and/or allow the requesting application to re-request at a later time, or with different parameters.

As previously alluded to, kernel space and user space processing are granted different privileges and/or priorities. More directly, custom packet processing provides performance benefits but may consume limited system resources. In some cases, the kernel space entity may need to decide whether or not to grant custom packet requests; in some cases, the kernel space entity may consider holistic operational considerations (e.g., overall processing and/or memory burden, user experience considerations, etc.)

Additionally, even though the foregoing illustrative examples are presented in the context of a single request/grant process, in practical application the kernel space entity may receive multiple requests. Since requests may be arbitrarily created by any user space application, multiple requests could conflict (e.g., different applications could request the same identifier, or contend for limited resources.) Thus, the exemplary kernel space entity may need to manage registration of custom packet types. For example, two conflicting requests could be handled in first-come-first-serve order; e.g., the first request is granted, and the second request is denied. Alternatively, the second request may be accepted with a unique amended identifier. Still other variants may handle the requests in sequence e.g., the first request is granted and when it terminates, the second request is granted.

More generally, requests may be granted in a variety of different ways. For example, custom packet processing may require additional processing, memory, and/or network bandwidth resources; in some cases, the kernel may use requirements information to determine whether or not the custom packet processing can be supported and/or which requests to support. In some implementations, a request that is denied may include denial information; this may enable the requester to re-request with an amended information. For example, a request may be rejected because the request included an identifier that is already reserved; a re-request with a different identifier may be granted. In other cases, a request that is denied may not provide any reason for denial. This may be particularly useful to prevent malicious activity and/or abuse.

More complicated implementations may use a structured negotiation process. For example, the kernel space entity may counter the request with different parameters than were originally requested; the counter may be accepted, denied, countered, etc. by the requesting entity. In other words, the registration process may enable explicit or implicit negotiations between the kernel space entity and the requesting entity as to kernel space and/or non-kernel space packet processing.

In some embodiments, the requesting process and/or the kernel space entity may perform authentication and/or authorization as part of the grant process. Authentication and/or authorization may be useful to prevent malicious activity. For example, the kernel space entity may check that a user space process has the appropriate privileges and permissions to request custom packet processing. In some cases, authentication and/or authorization may be performed locally. In other cases, authentication and/or authorization may be based on an externally trusted 3' party (e.g., based on an external permissions service).

Still other techniques for requesting and/or granting custom packet types may be substituted with equal success by artisans of ordinary skill in the related arts, given the contents of the present disclosure. Examples of such schemes may include without limitation, limited or conditional grant/denial, grant/denial based on historic benefits or abuse, fixed use or semi-fixed use, etc.

Referring back to FIG. 13A, the custom packet type can be cleared from the custom packet type registry when released (step 1306 of the method 1300). In the illustrated embodiment, the custom packet type may be explicitly released by the requesting process when the requesting process has ended; in some cases, the custom packet type may also be implicitly cleared by the kernel when the requesting process ends or is terminated.

In some embodiments, the custom packet type may be allowed to persist even after the requesting process has ended. For example, a vendor specific packet type may be shared across the vendor's different processes. In some such implementations, the custom packet type may be associated with a lifetime. When the grant expires, the custom packet type may be re-requested and granted, renewed, or otherwise extended. In some implementations, the custom packet type may be associated with a number of applications; so long as at least one of the applications is active, the custom packet type may remain active. Still other techniques may simply allow the custom packet type to persist until a conflict arises; if necessary, the stale custom packet registration can be re-assigned, etc.

FIG. 13B is a logical flow diagram of an exemplary method 1350 for requesting custom packet data structures, in accordance with the various principles described herein.

At step 1352 of the method 1350, a non-kernel space entity requests a custom packet type. In one embodiment, the request may be generated by a user application; in other embodiments, the request may be generated by a non-kernel space application (e.g., a driver application, daemon process, etc.) While the foregoing discussion is presented in the context of internal device operation (kernel and user space), the various techniques described herein may be broadly applied to any logical entity that benefits from custom kernel processing.

In one such illustrative example, an external entity (e.g., $2^{nd}$ and/or $3^{rd}$ party services) may create new custom packet types that can be adopted or disregarded by users without requiring software updates. As a brief aside, packet types have been historically defined within standards promulgated by standard setting organizations (e.g., the IEEE promulgates the IEEE 802.1Q standard, etc.) In some cases, changes to the underlying standard may require new software distributions and compliance testing may be long and involved. Consistent rollouts via software updates (and occasionally rollbacks when required) can also be problematic. Enabling a standard setting organization to gradually evolve support for new packet types using custom packet types may offer significant benefits over traditional rollout techniques. As but another example, vendor specific applications may benefit from custom packet handling. For instance, certain applications may experience inefficient context switching due to packet sizes and/or processing. Custom packet sizes and/or processing that cater to the vendor specific application may improve operation merely by preventing context switching. Still other implementations may be substituted by artisans of ordinary skill, given the contents of the present disclosure.

In some embodiments, the non-kernel space application creates a custom packet type request subject to kernel restrictions. Notably, while custom packet processing exposes some kernel space functionality to non-kernel space applications, certain restrictions on non-kernel space applications may be required, defined, or otherwise made known. In some embodiments, these restrictions may be a structural limitation of the custom packet type request. As but one such example, a non-kernel application may request a custom packet format by specifying a number of data fields, their purpose, and/or their size. Malformed requests that do not comply with the custom packet request structure are impermissible and may be automatically disregarded.

Similarly, certain types of packet processing may be enabled, disabled, or subject to limited configuration. In some cases, custom packet processing may be exposed via a flexible application programming interface (API). For example, the custom packet processing API may expose arithmetic and/or flow control functionality to the requesting process. Custom packet processing may be described via the API for kernel space execution. In other cases, custom packet processing may expose a set of predefined options. For instance, a custom packet request may specify whether or not CRC (cyclic redundancy checks) should be performed and/or an enumerated set of selectable CRC polynomials.

The techniques described herein enable non-kernel space applications to request access to certain types of kernel space functionality. While the present disclosure has described certain specific illustrative examples, other implementations may widely vary in terms of packet data structure, protocol, and/or packet processing capability. More generally, the various techniques described herein may be used to request access to perform any shared kernel space and non-kernel space processing and are broadly applicable to any hybrid packet processing operation e.g., where the packet data structure or its processing may be used by both kernel space and user space for packet processing.

As previously noted, if the request is accepted, then the reserved custom packet type identifier can be used (step 1354 of the method 1350). When the non-kernel space entity finishes its operation or when the non-kernel space entity terminates, the custom packet type can be released from the custom packet type registry (step 1356 of the method 1350).

As illustrated supra, the exemplary user space networking architectures described herein enables new techniques not previously possible. For example, user space applications can use custom type registries and/or data structures to coordinate user space and kernel space packet processing. More generally however, the principles described herein are broadly applicable to any non-kernel space application that benefits from managing, coordinating, and/or otherwise sharing kernel space functionality/information with a non-kernel space application and vice versa.

Figures 14A, 14B:
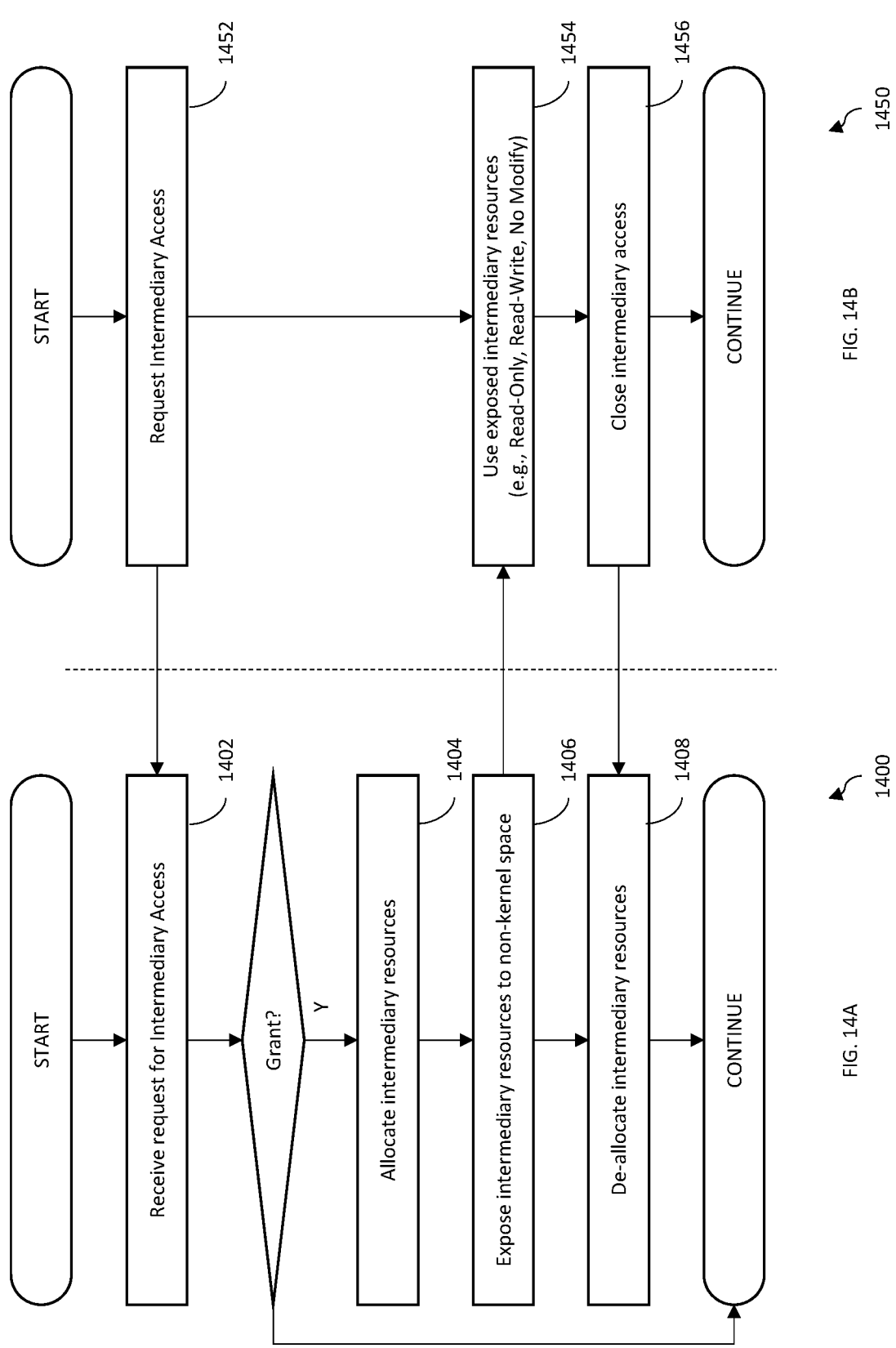
FIGS. 14A-14B are logical flow diagrams of exemplary methods for providing intermediary access, in accordance with the various principles described herein.

FIG. 14A is a logical flow diagram of an exemplary method 1400 for providing intermediary access to a non-kernel space process, in accordance with the various principles described herein.

At step 1402 of the method 1400, a kernel space entity receives a request for intermediary access. While various embodiments of the present disclosure are presented in the context of a user space application that requests intermediary access via an application programming interface (API) or kernel extension (kext), artisans of ordinary skill in the related arts will readily appreciate that other situations may occur where intermediary access is imposed or pushed to a non-kernel space process. For example, a user space application that meets certain criteria (e.g., a legacy kext for packet inspection of other user space applications) may be assigned, advised, or otherwise re-directed to use intermediary access.

As used herein, the term "intermediary" refers to a logical entity that has access to the data transactions between two or more logical entities. For example, in the context of the flow switch, an intermediary application may have access to the data flow between the source entity (the entity transmitting data) and the sink entity (the entity receiving data). Notably, a data flow may pass through multiple intermediary entities. Intermediary access may be unfettered or restricted by the kernel; the access may be read-write, read-only, read-no-modify (but drop), zero-copy, and/or any other access privilege.

In some embodiments, the request may identify the type of intermediary access, the source entity, the sink entity, and/or any required resources. For example, a filter application may request read-no-modify (but drop), for all data flows into a sink entity. Similarly, a network monitor may request read-only access for all data flows generated from a source entity. In some situations, the kernel space entity may receive multiple requests for intermediary access. However, since certain applications may have the ability to modify the data flow, situations may arise where the ordering of applications with intermediary access matters. Various embodiments of the present disclosure may further enable applications to specify (or request) an order; in some cases, the kernel space entity may consider the requested order and/or assign or re-assign an order to connected intermediary applications in view of its own considerations.

In some variants, the intermediary access may implicitly define the required resources; for example, the kernel space entity may allocate a data structure that is sufficiently sized to support the intermediary access. In other variants, the requesting process may have internal constraints and may notify the kernel space entity of such constraints. For example, the requesting process may require a minimum memory size, processor speed, latency, throughput, etc. Still other constraints may be identified by the requesting process; constraint information may be used by the kernel space entity to e.g., allocate resources, monitor how intermediary access is used, and/or limit resource utilization.

Referring back to the method 1400 of FIG. 14A, the resources may be allocated for intermediary access when the request is granted (step 1404), otherwise intermediary access is denied and the method 1400 ends.

As previously noted, most user space processes run in a specific memory space (a "sandbox") and cannot access the memory of other processes unless explicitly allowed; however, the traditional protections and privacy of sandboxed operation may be compromised by intermediary applications. Additionally, intermediary access consumes system resources but often provides limited performance benefit. Consequently, the kernel space entity may limit intermediary access processing for a variety of reasons. Examples of considerations may include, without limitation, insufficient privilege of the requesting process, excessive performance loss, and/or re-prioritization, etc.

In one exemplary embodiment, the resource allocation includes a transmit and a receive ring data structure. The transmit and receive ring store copies of the original packet data such that the intermediary application does not have direct access to the original packet data. Other implementations may use a greater or fewer data structures. For example, zero-copy intermediary access allows the intermediary application to directly access the original packet data (copied data structures are not required). Similarly, simple implementations may allocate a single unstructured address space, while more complicated implementations may allocate multiple data structures. More generally, while the illustrative examples described supra allocate memory resources, artisans of ordinary skill in the related arts, given the contents of the present disclosure, will readily appreciate that virtually any resource may be substituted with equal success. Examples of other resources may include without limitation, processing cycles, dedicated logic and/or other hardware accelerators, power, etc.

In some embodiments, the requesting process and/or the kernel space entity may perform authentication and/or authorization as part of the grant process. As previously noted, authentication and/or authorization may be useful to prevent malicious activity. For example, the kernel space entity may check that a user space process has the appropriate privileges and permissions to request intermediary access. In some cases, authentication and/or authorization may be performed locally.

In some embodiments, granted intermediary resources are exposed to the non-kernel space entity at step 1406 of the method 1400. The exposed resources may be accessed in accordance with the granted access privileges; e.g., read-write, read-only, read-no-modify (but drop), zero-copy, and/or any other access privilege. In some implementations, intermediary applications may be monitored to ensure compliance with their granted access; for example, an application that has only read-only access may be flagged for attempting write access. In some cases, excessive deviation from expected behavior may be indicative of malicious activity and/or trigger enforcement activity (increased scrutiny, termination, future blacklisting, etc.)

When closed, the intermediary resources may be deallocated (step 1408 of the method 1300). The intermediary resources may be explicitly released by the requesting process when the requesting process has ended; in some cases, the intermediary resources may also be implicitly cleared by the kernel when the intermediary application ends or is terminated.

FIG. 14B is a logical flow diagram of an exemplary method 1450 for requesting and using intermediary access, in accordance with the various principles described herein. At step 1452 of the method 1450, a non-kernel space entity requests intermediary access. In one embodiment, the request may be generated by a user application; in other embodiments, the request may be generated by a non-kernel space application (e.g., a driver application, daemon process, etc.) While the foregoing discussion is presented in the context of internal device operation (kernel and user space), the various techniques described herein may be broadly applied to any logical entity that benefits from intermediary access.

In some embodiments, the non-kernel space application creates an intermediary access request subject to certain restrictions. As previously noted, intermediary access may share sensitive information between applications, thus restrictions may be imposed by the kernel and/or the source/sink entities. In some embodiments, these restrictions may be based on the application type. For example, a network filter application may be permitted to read and drop packets (but not write to packet payloads). In another example, a packet sniffing application may only have read-only access. In some cases, the restriction may be based on relative privileges and/or permissions. For example, an intermediary application may have privileges to view traffic between certain source and sink entities. In another such example, an intermediary application may have explicit permission from entities to monitor their traffic.

Similarly, certain types of intermediary access may be enabled, disabled, or subject to limited configuration. In some cases, intermediary access may be exposed via a flexible application programming interface (API). For example, the intermediary access API may expose arithmetic and/or flow control functionality to the requesting processor. Any intermediary access that can be described within the API can be requested. In other cases, intermediary access may expose a set of predefined options. Examples of such functions may include packet filtering, packet monitoring, network simulations, man-in-the-middle type communications, virtual private network (VPN) and/or other tunneling techniques. The techniques described herein enable non-kernel space applications to request access to other non-kernel space data. While the present disclosure has described certain specific illustrative examples, other implementations may widely vary in terms of access rights, request/grant protocol, and/or packet processing capability. More generally, the various techniques described herein may be broadly applicable to any pass-through processing of data flows.

At step 1454 of the method 1450, the non-kernel space entity can access exposed intermediary resources. When the non-kernel space entity finishes its operation or when the non-kernel space entity terminates, the intermediary access and corresponding intermediary resources are closed or otherwise relinquished (step 1456 of the method 1450).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for enabling an intermediary packet processing stage by a kernel space entity, the method comprising:

receiving a request from an intermediary application operating in a user space, for intermediary access to a data flow between a first non-kernel application and a second non-kernel application;

granting restricted access to the data flow by the intermediary application in response to the request, the restricted access enabling access to a first access privilege of a plurality of access privileges and forbidding access to a second access privilege of the plurality of access privileges;

allocating a data structure in response to the granting;

exposing the data structure to the intermediary application;

inserting the data flow from the first non-kernel application into the data structure; and monitoring the intermediary application for compliance with the restricted access.

2. The method of claim 1, wherein:

the data structure comprises a receive data structure and a transmit data structure;

the inserting the data flow comprises copying the data flow into the receive data structure; and wherein the method further comprises:

exposing the receive data structure and the transmit data structure to the intermediary application.

3. The method of claim 2, further comprising providing the transmit data structure as an input data flow to the second non-kernel application.

4. The method of claim 1, further comprising de-allocating the data structure when the intermediary application terminates.

5. The method of claim 1, wherein the data structure comprises a zero-copy data structure and the inserting the data flow from the first non-kernel application comprises an original write of the data flow into the zero-copy data structure.

6. The method of claim 1, wherein the intermediary access comprises read-only access to the data structure.

7. The method of claim 1, wherein the intermediary access comprises read-write access to the data structure.

8. An intermediary packet processing device, comprising:

a communication interface configured to exchange digital communications with an external device;

a memory that stores allocation information; and one or more processors configured to:

receive a request from an intermediary application operating in a user space, for intermediary access to a data flow between a first non-kernel application and a second non-kernel application;

grant restricted access to the data flow in response to the request, the restricted access enabling access to a first access privilege of a plurality of access privileges and forbidding access to a second access privilege of the plurality of access privileges;

allocate a data structure in response to the grant;

expose the data structure to the intermediary application;

insert the data flow from the first non-kernel application into the data structure; and monitor the intermediary application for compliance with the restricted access.

9. The device of claim 8, wherein the data structure comprises a receive data structure and a transmit data structure, wherein the inserting includes copying the data flow into the receive data structure, and wherein the one or more processors are further configured to expose the receive data structure and the transmit data structure to the intermediary application.

10. The device of claim 8, wherein the one or more processors are further configured to de-allocate the data structure when the intermediary application terminates.

11. The device of claim 8, wherein the data structure includes a zero-copy data structure and the inserting includes an original write of the data flow into the zero-copy data structure.

12. The device of claim 8, wherein the intermediary access includes read-only access to the data structure.

13. The device of claim 8, wherein the intermediary access comprises read-write access to the data structure.

14. A non-transitory computer-readable storage medium having stored thereon instructions that, when executed by one or more processors of a computing device having a kernel space entity, cause the kernel space entity to perform operations, comprising:

receiving a request from an intermediary application operating in a user space, for intermediary access to a data flow between a first non-kernel application and a second non-kernel application;

granting restricted access to the data flow by the intermediary application in response to the request, the restricted access enabling access to a first access privilege of a plurality of access privileged and forbidding access to a second access privilege of the plurality of access privileges;

allocating a data structure in response to the granting;

exposing the data structure to the intermediary application;

inserting the data flow from the first non-kernel application into the data structure; and monitoring the intermediary application for compliance with the restricted access.

15. The non-transitory computer-readable storage medium of claim 14, wherein:

the data structure comprises a receive data structure and a transmit data structure;

the inserting the data flow comprises copying the data flow into the receive data structure; and wherein the operations further comprise:

exposing the receive data structure and the transmit data structure to the intermediary application.

16. The non-transitory computer-readable storage medium of claim 15, wherein the operations further comprise providing the transmit data structure as an input data flow to the second non-kernel application.

17. The non-transitory computer-readable storage medium of claim 14, the operations further comprising de-allocating the data structure when the intermediary application terminates.

18. The non-transitory computer-readable storage medium of claim 14, wherein the data structure comprises a zero-copy data structure and the inserting the data flow from the first non-kernel application comprises an original write of the data flow into the zero-copy data structure.

19. The non-transitory computer-readable storage medium of claim 14, wherein the intermediary access comprises read-only access to the data structure.

20. The non-transitory computer-readable storage medium of claim 14, wherein the intermediary access comprises read-write access to the data structure.

* * * * *